Figure 1:
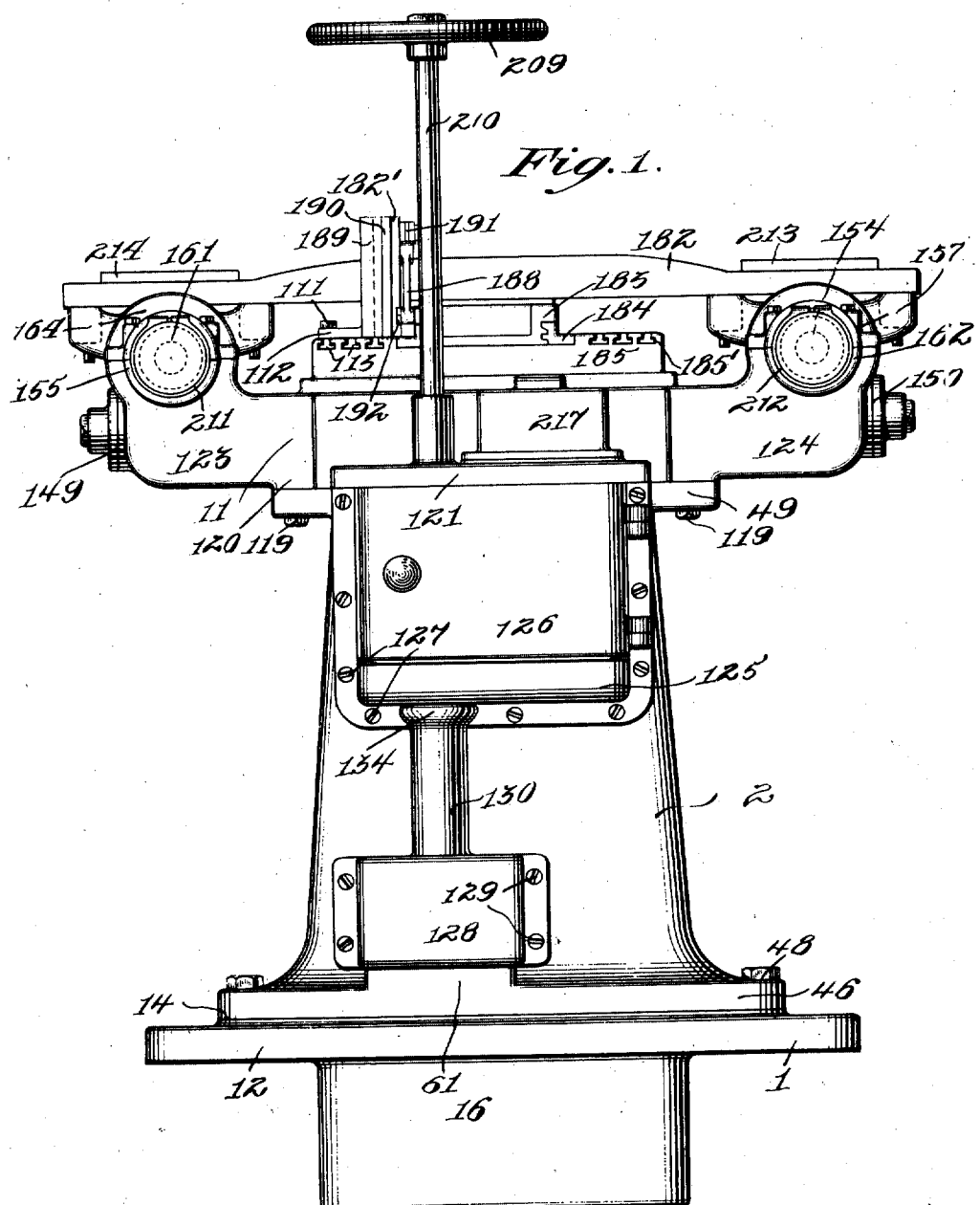

F. H. RICHARDS.
CARVING MACHINE.
APPLICATION FILED DEC. 15, 1905. RENEWED APR. 7, 1911.

1,008,436.

Patented Nov. 14, 1911.
29 SHEETS—SHEET 1.

F. H. RICHARDS.
CARVING MACHINE.
APPLICATION FILED DEC. 15, 1905. RENEWED APR. 7, 1911.

1,008,436.

Patented Nov. 14, 1911.

29 SHEETS—SHEET 4.

F. H. RICHARDS.
CARVING MACHINE.
APPLICATION FILED DEC. 15, 1905. RENEWED APR. 7, 1911.

1,008,436.

Patented Nov. 14, 1911.
29 SHEETS—SHEET 5.

F. H. RICHARDS.
CARVING MACHINE.
APPLICATION FILED DEC. 15, 1905. RENEWED APR. 7, 1911.

1,008,436.

Patented Nov. 14, 1911.
29 SHEETS—SHEET 7.

Witnesses:
Calderon C. Fuss.
R. W. Pittman

Inventor:
F. H. Richards.

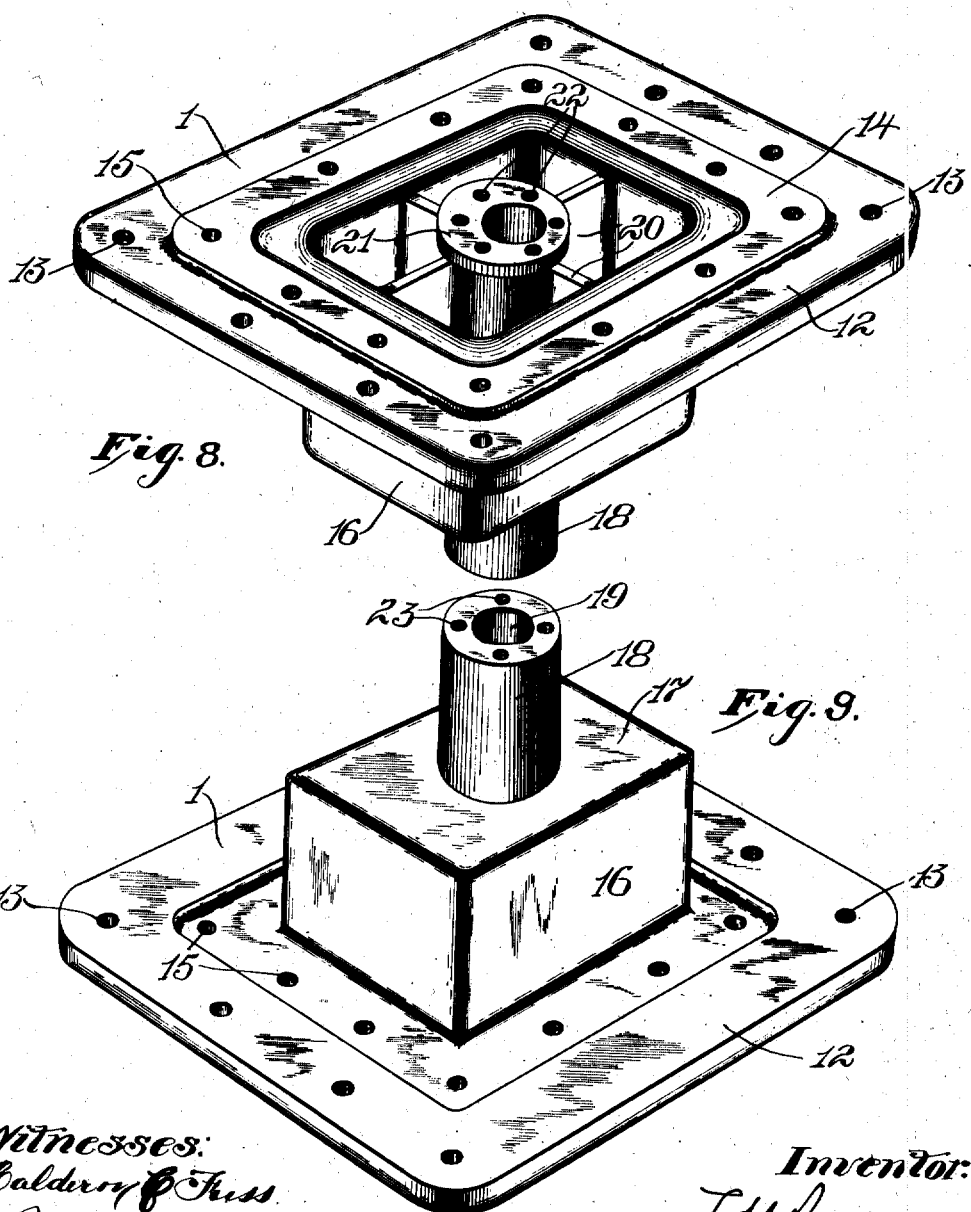

F. H. RICHARDS.
CARVING MACHINE.
APPLICATION FILED DEC. 15, 1905. RENEWED APR. 7, 1911.
1,008,436.
Patented Nov. 14, 1911.
29 SHEETS—SHEET 9.
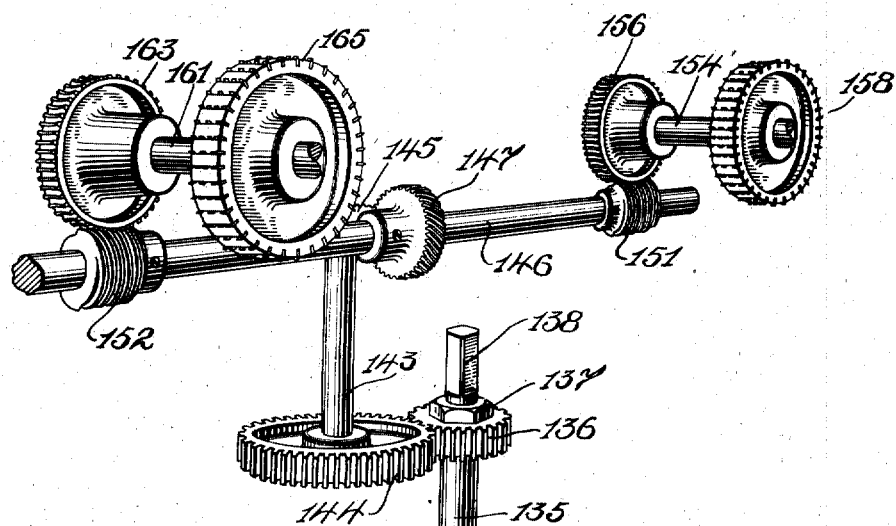
Fig. 10.
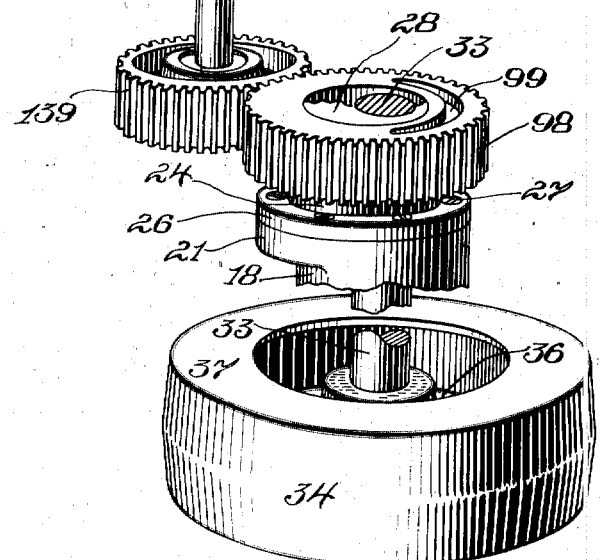
Witnesses:
A. C. Abbott
G. G. Fuss
Inventor,
F. H. Richards F. H. RICHARDS.
CARVING MACHINE.
APPLICATION FILED DEC. 15, 1905. RENEWED APR. 7, 1911.

1,008,436.

Patented Nov. 14, 1911.
29 SHEETS—SHEET 10.

Witnesses:
Inventor
F. H. Richards.

F. H. RICHARDS.
CARVING MACHINE.
APPLICATION FILED DEC. 15, 1905. RENEWED APR. 7, 1911.

1,008,436.

Patented Nov. 14, 1911.

29 SHEETS—SHEET 1.

Witnesses:
Inventor:

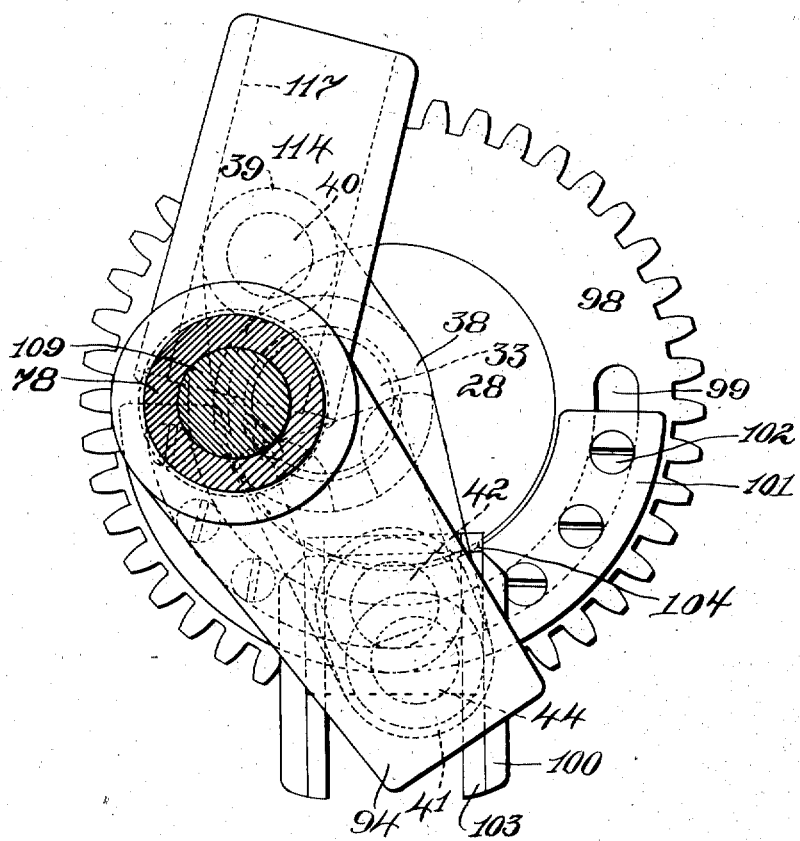

F. H. RICHARDS.
CARVING MACHINE.
APPLICATION FILED DEC. 15, 1905. RENEWED APR. 7, 1911.
1,008,436.
Patented Nov. 14, 1911.
29 SHEETS—SHEET 13.
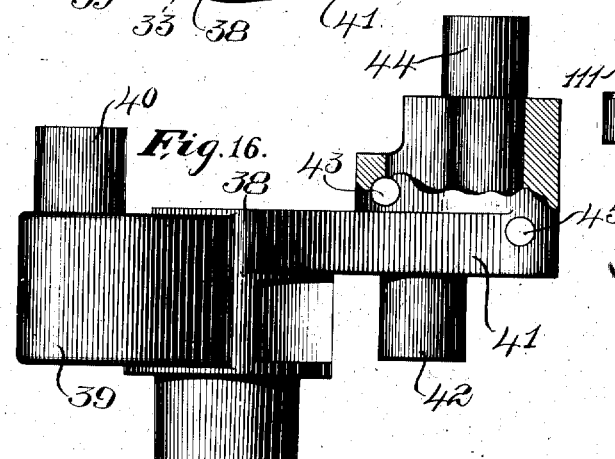

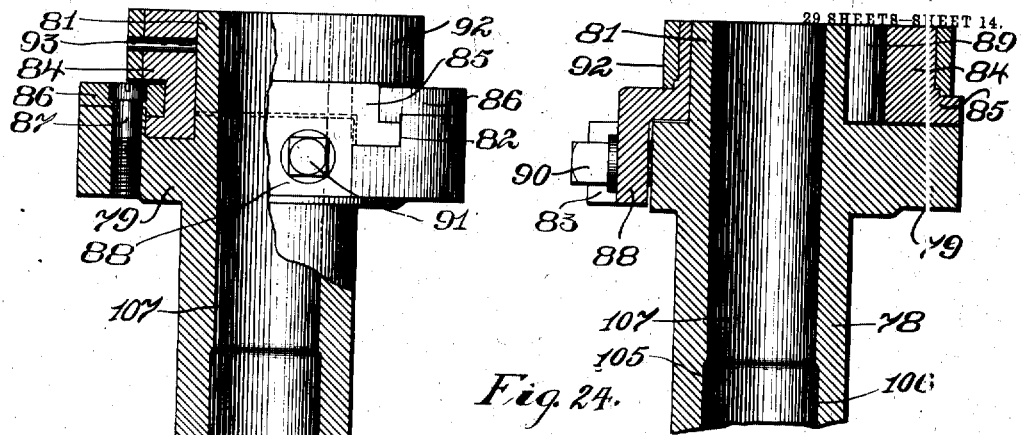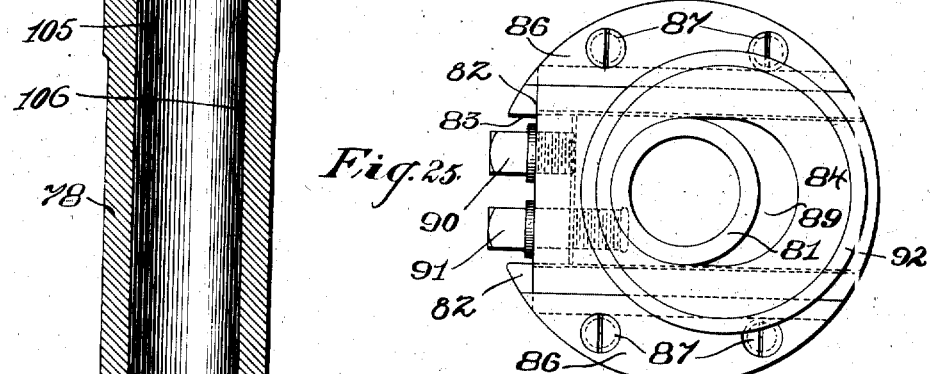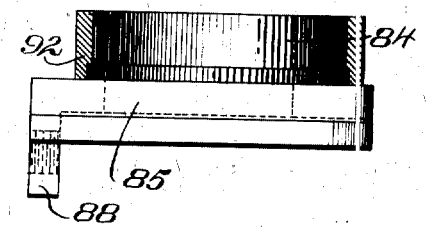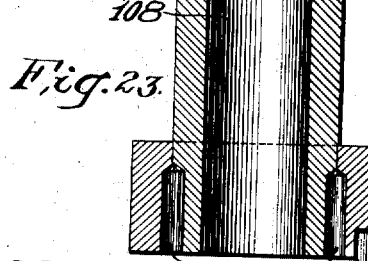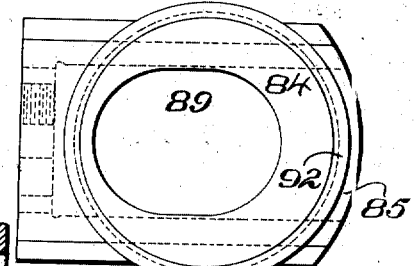

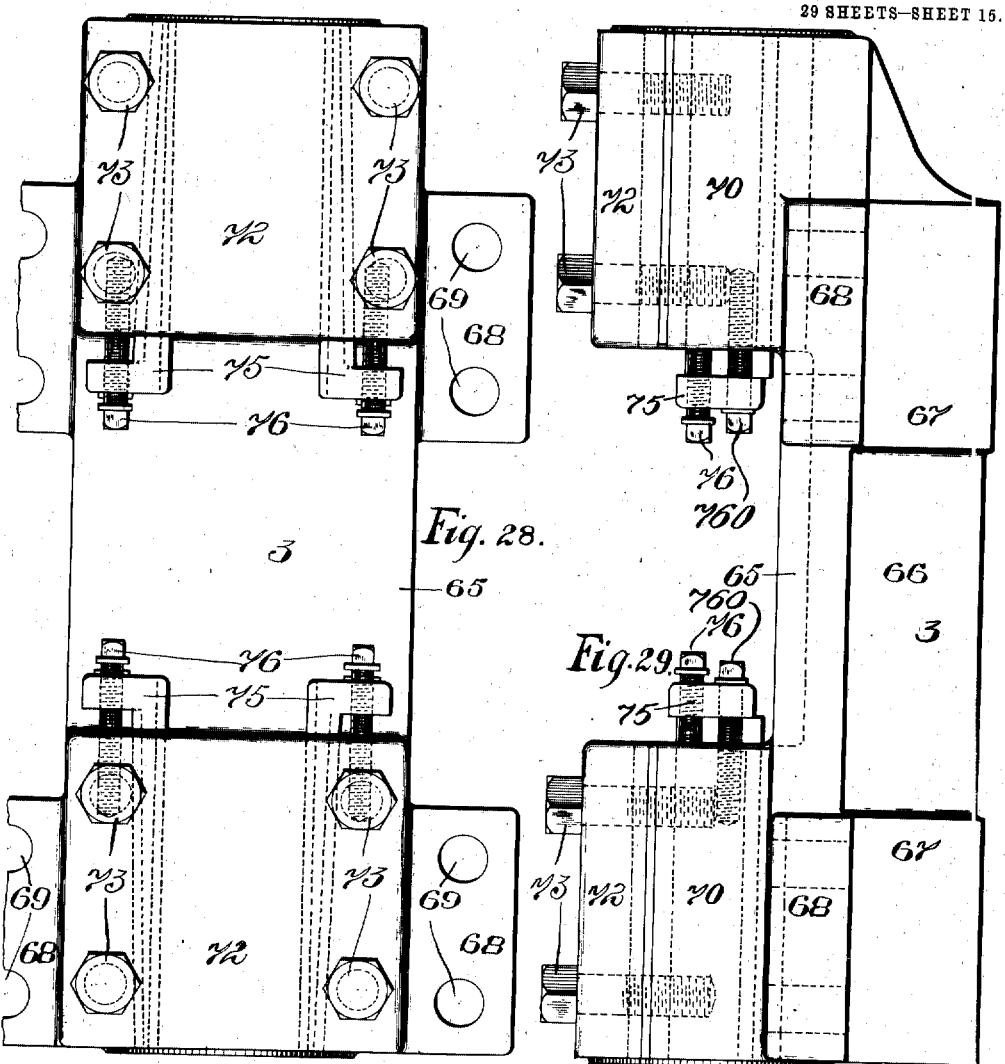

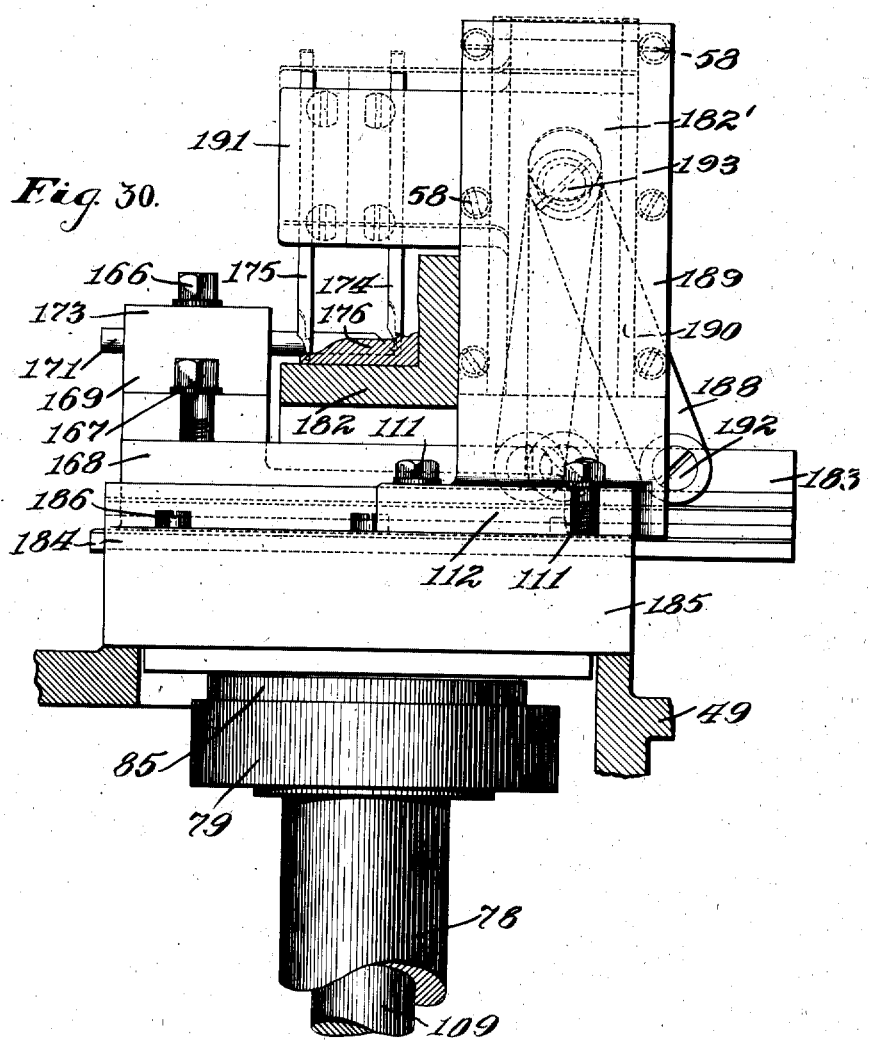

F. H. RICHARDS.
CARVING MACHINE.
APPLICATION FILED DEC. 15, 1905. RENEWED APR. 7, 1911.

1,008,436.

Patented Nov. 14, 1911.
29 SHEETS—SHEET 18.

F. H. RICHARDS.
CARVING MACHINE.
APPLICATION FILED DEC. 15, 1905. RENEWED APR. 7, 1911.

1,008,436.

Patented Nov. 14, 1911.
29 SHEETS—SHEET 20.

Witnesses:
Wm C. McKenzie
R. W. Pittman

Inventor:
F. H. Richards.

F. H. RICHARDS.
CARVING MACHINE.
APPLICATION FILED DEC. 15, 1905. RENEWED APR. 7, 1911.
1,008,436.
Patented Nov. 14, 1911.
29 SHEETS—SHEET 21.
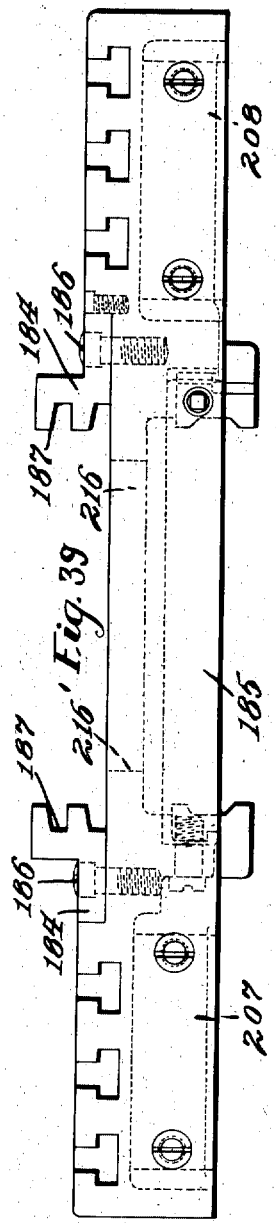
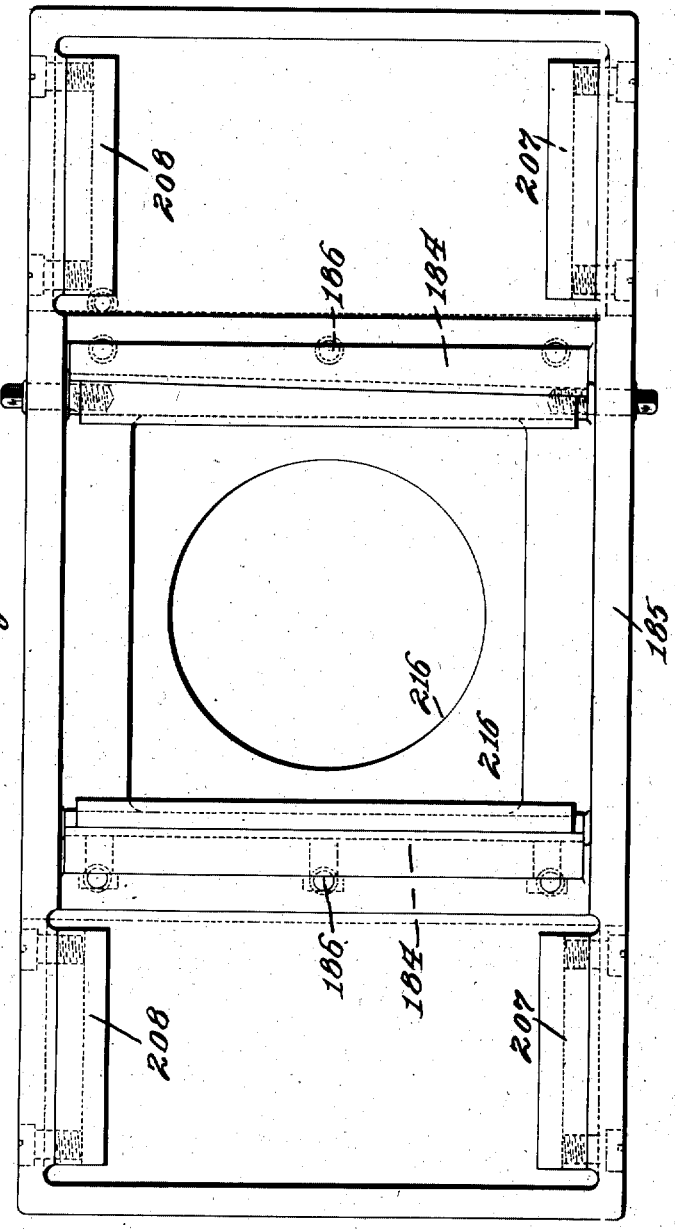

F. H. RICHARDS.
CARVING MACHINE.
APPLICATION FILED DEC. 15, 1905. RENEWED APR. 7, 1911.

1,008,436.

Patented Nov. 14, 1911.
29 SHEETS—SHEET 2.

Witnesses:
Caldron C Fess
R. W. Pittman

Inventor:
F. H. Richards

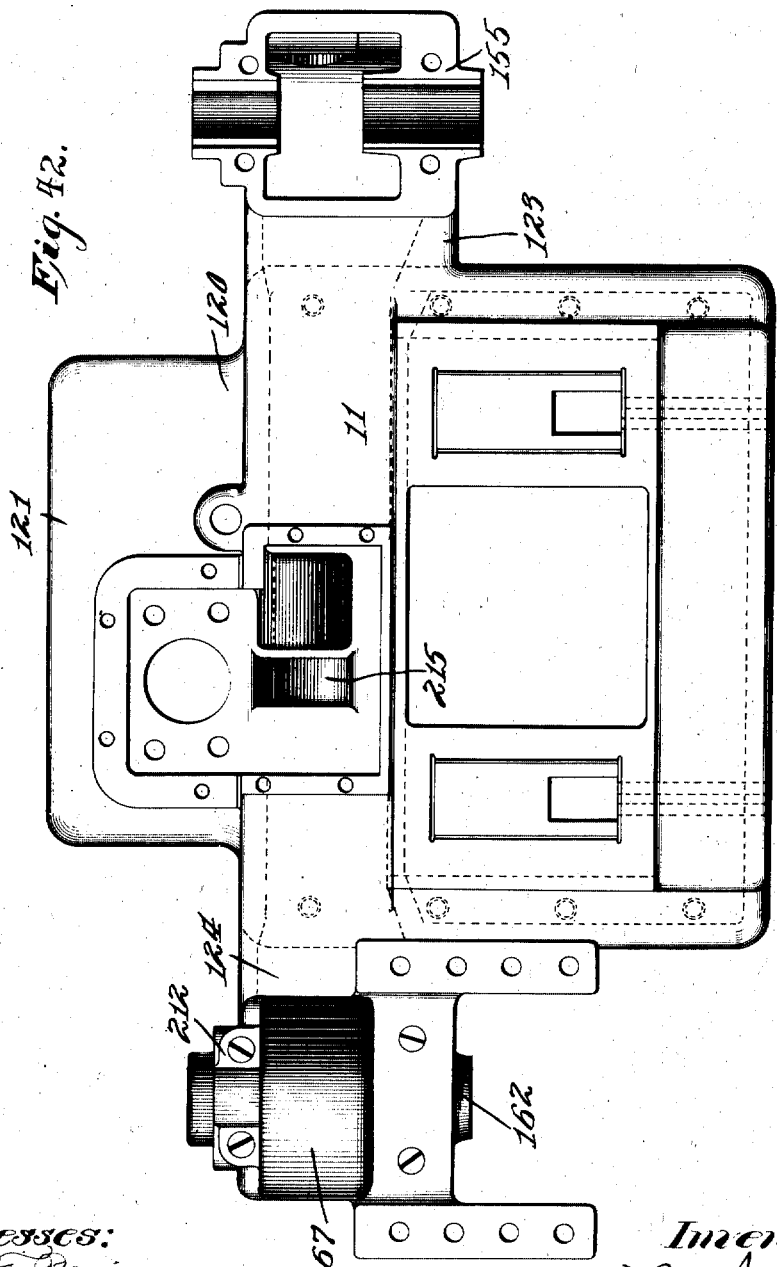

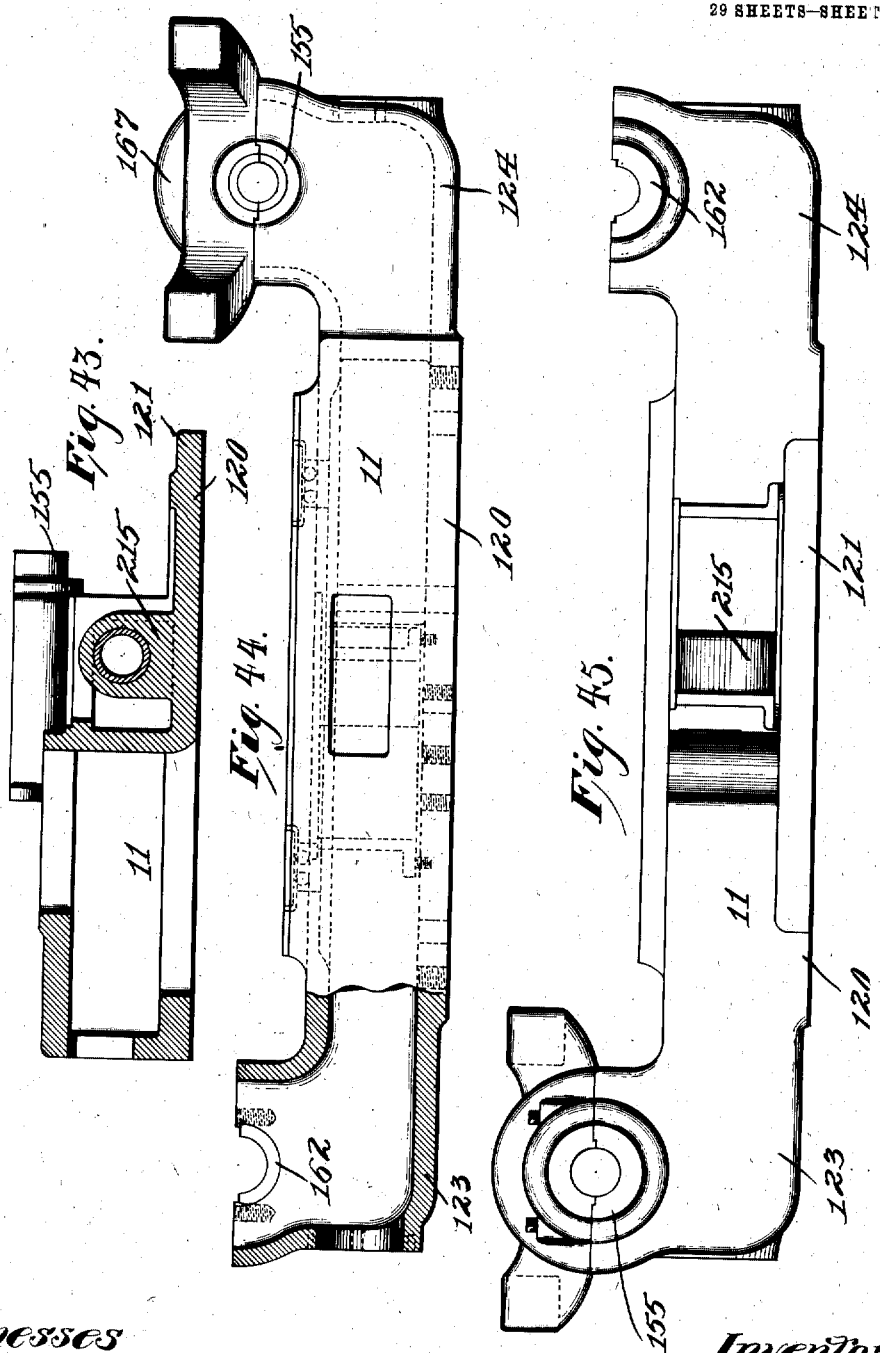

F. H. RICHARDS.
CARVING MACHINE.
APPLICATION FILED DEC. 15, 1905. RENEWED APR. 7, 1911.
1,008,436.
Patented Nov. 14, 1911.
29 SHEETS—SHEET 26.
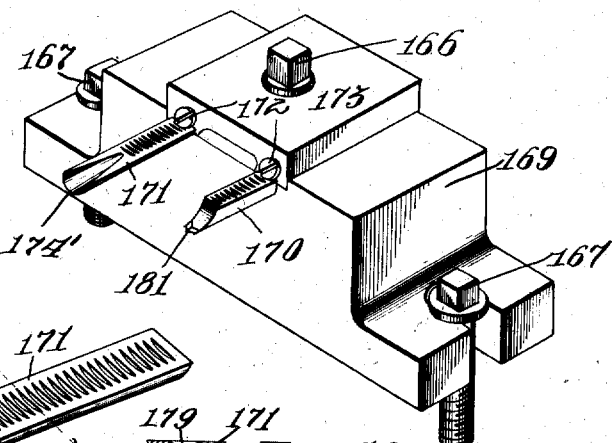
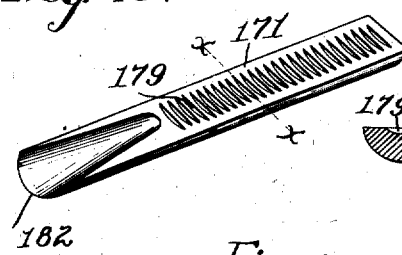
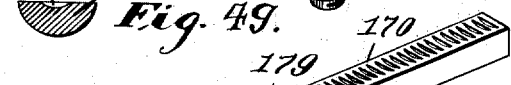
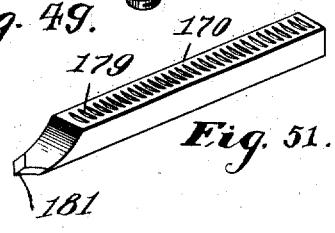
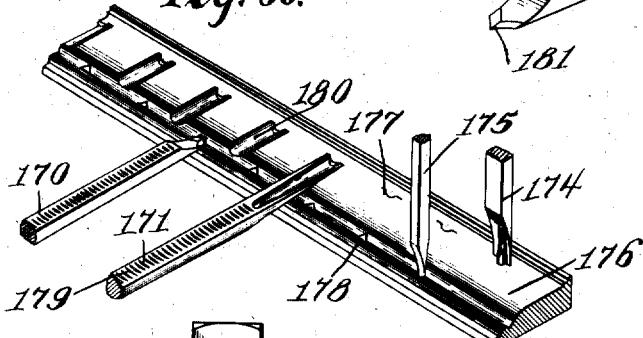
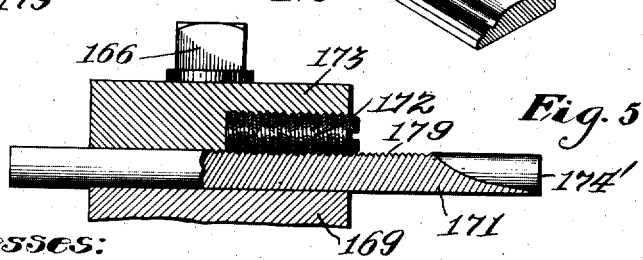
Witnesses:
Inventor F. H. RICHARDS.
CARVING MACHINE.
APPLICATION FILED DEC. 15, 1905. RENEWED APR. 7, 1911.

1,008,436.

Patented Nov. 14, 1911.
29 SHEETS—SHEET 27.

Witnesses:

Inventor:
F. H. Richards.

F. H. RICHARDS.
CARVING MACHINE.
APPLICATION FILED DEC. 15, 1905. RENEWED APR. 7, 1911.
1,008,436.
Patented Nov. 14, 1911.
29 SHEETS—SHEET 28.
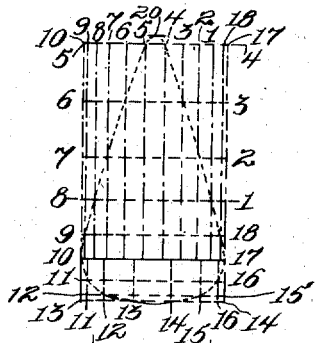
*Fig. 54.*
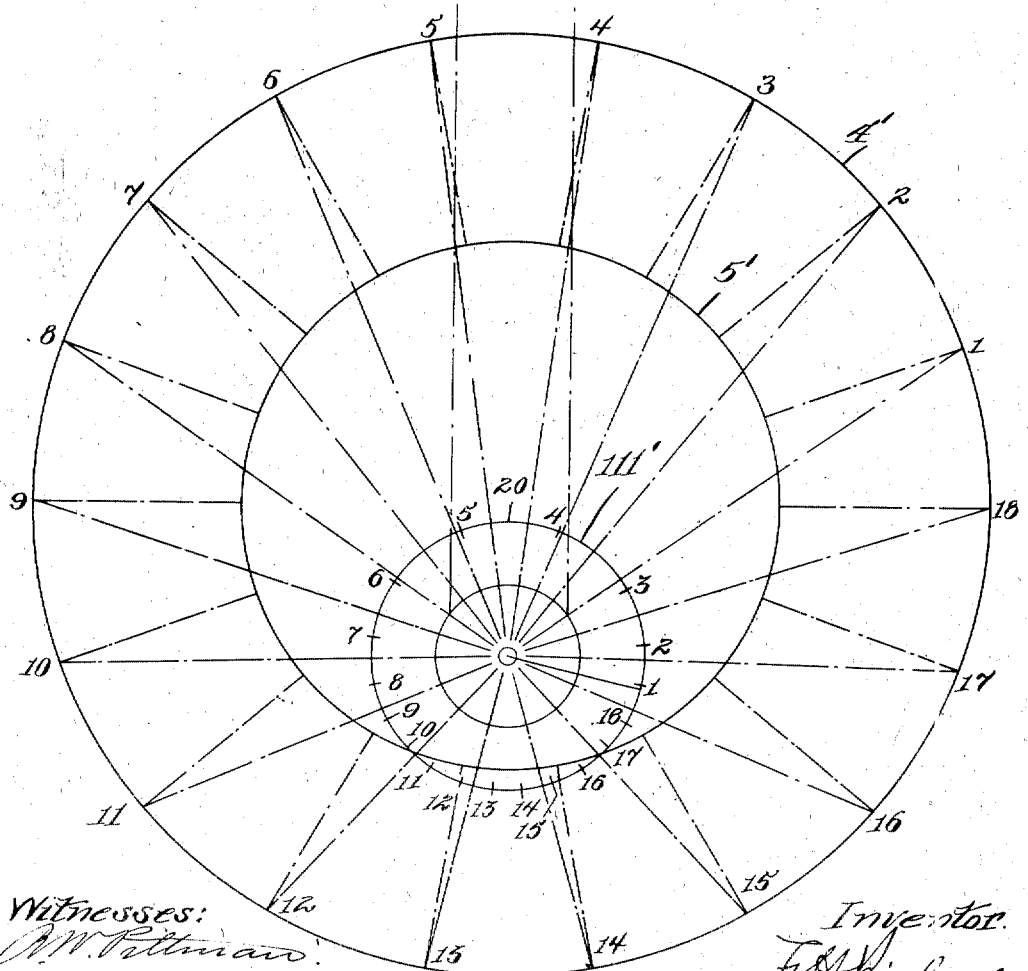
Witnesses:
Inventor.

F. H. RICHARDS.
CARVING MACHINE.
APPLICATION FILED DEC. 15, 1905. RENEWED APR. 7, 1911.

1,008,436.

Patented Nov. 14, 1911.

Witnesses:
Inventor.

UNITED STATES PATENT OFFICE.

FRANCIS H. RICHARDS, OF HARTFORD, CONNECTICUT.

CARVING-MACHINE.

1,008,436. Specification of Letters Patent. Patented Nov. 14, 1911.

Application filed December 15, 1905, Serial No. 291,858. Renewed April 7, 1911. Serial No. 619,602.

*To all whom it may concern:*

Be it known that I, FRANCIS H. RICHARDS, a citizen of the United States, residing at Hartford, in the county of Hartford and State of Connecticut, have invented certain new and useful Improvements in Carving-Machines, of which the following is a specification.

This invention relates to wood carving machines and more particularly to such machines as are employed for carving moldings and producing a series of designs in repeat upon the moldings.

The molding stock will be fed through the machine continuously, but with variable velocity. And the tools for incising the stock will be knives which will be carried by a main carriage reciprocatory in a path parallel to the path of the stock feed, and which carriage will be reciprocated with a variable movement, and the two variable movements, namely, the carriage and the stock will be set in opposition one to the other, which will produce a coincidence of movement during a portion of each cycle, and during which coincidence of direction of movement and speed of movement the knives will be advanced into the profile of the stock during a period of their travel transversely to the path of stock.

In the mechanism herein illustrated the coincidence in speed and direction of movement between the stock feed and the main carriage takes place when the stock is moving at its fastest and when such carriage is moving at its slowest speed. It is not essential to the working of the machine that the coincidence of movement occurs at these relative periods, but it is necessary that there shall be coincidence of speed during coincidence of direction. Satisfactory results are obtained, however, by having the coincidence occur while the stock is moving at its fastest speed and while the main carriage is moving at its slowest speed, since it will give the main carriage an opportunity to retreat quickly and again get into a position to repeat its operation, so that when the knives have approached to such a point that they will intercept the path of movement of the stock the parts will have overcome any vibration or trembling movement incident to reversal of movement.

In machines of this character wherein the feed of the stock is intermittent and is stopped each time it is to be carved upon it is impossible to stop it exactly at the predetermined positions and the stopping and starting of the stock consumes much time, but if it is kept moving continuously and is moving during the actual carving operation greater precision of the position of the carved ornaments upon the product will be had.

The stock will generally be carved by a series of transverse incisions, a tool moving transversely of the stock will score off, as it were, the end of the design or partial design, and a knife moving in a path transverse to the former knife will make its cut, finishing the design or design element started by the cut of the first knife, and each of these knives, or it may be a set of knives, will be mounted upon a carriage and the carriages will be mounted in guides in the main carriage.

A practicable form of embodiment of my improvement is illustrated in the drawings accompanying and forming a part of the present specification; wherein—

Figure 2:
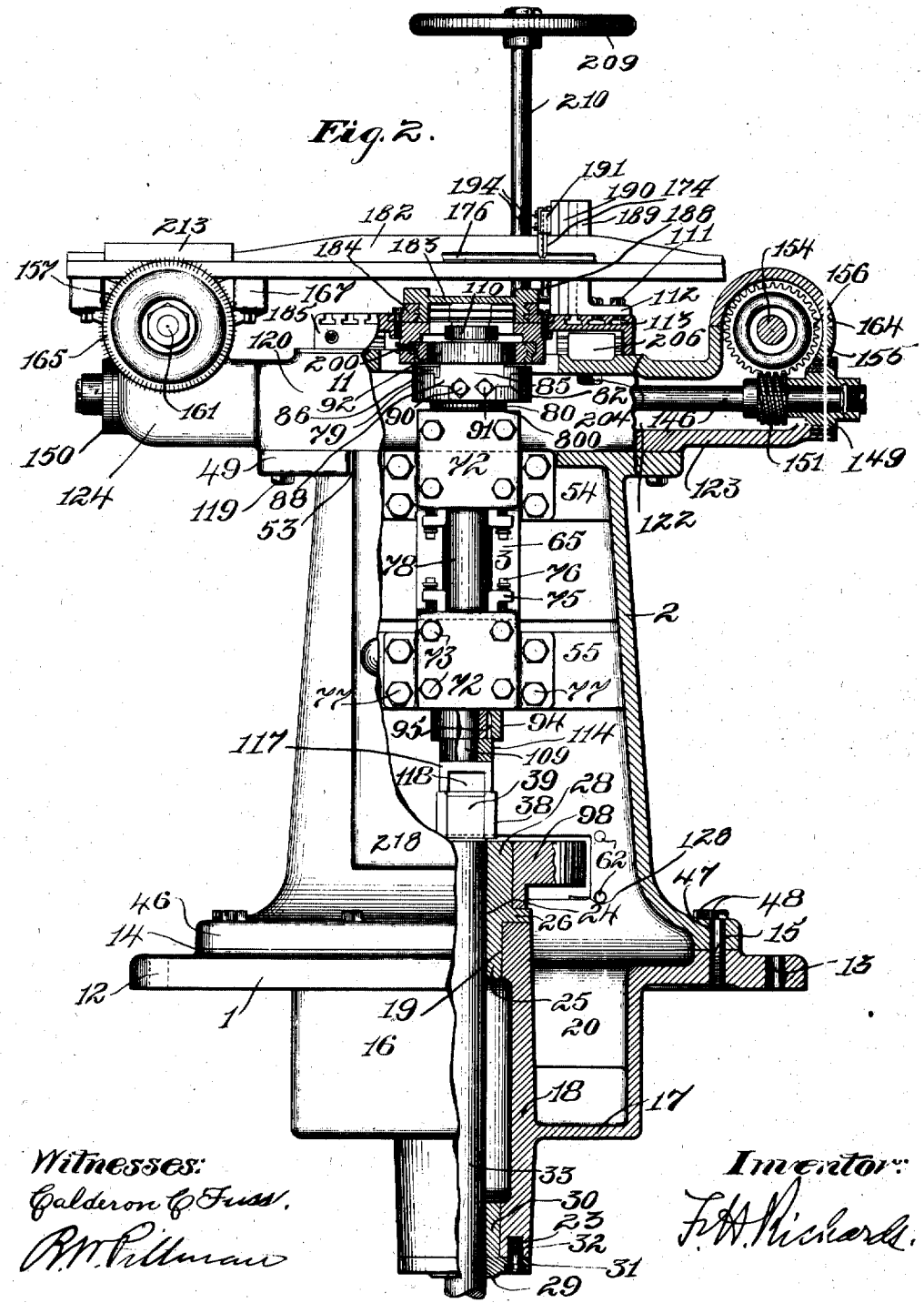
Figure 3:
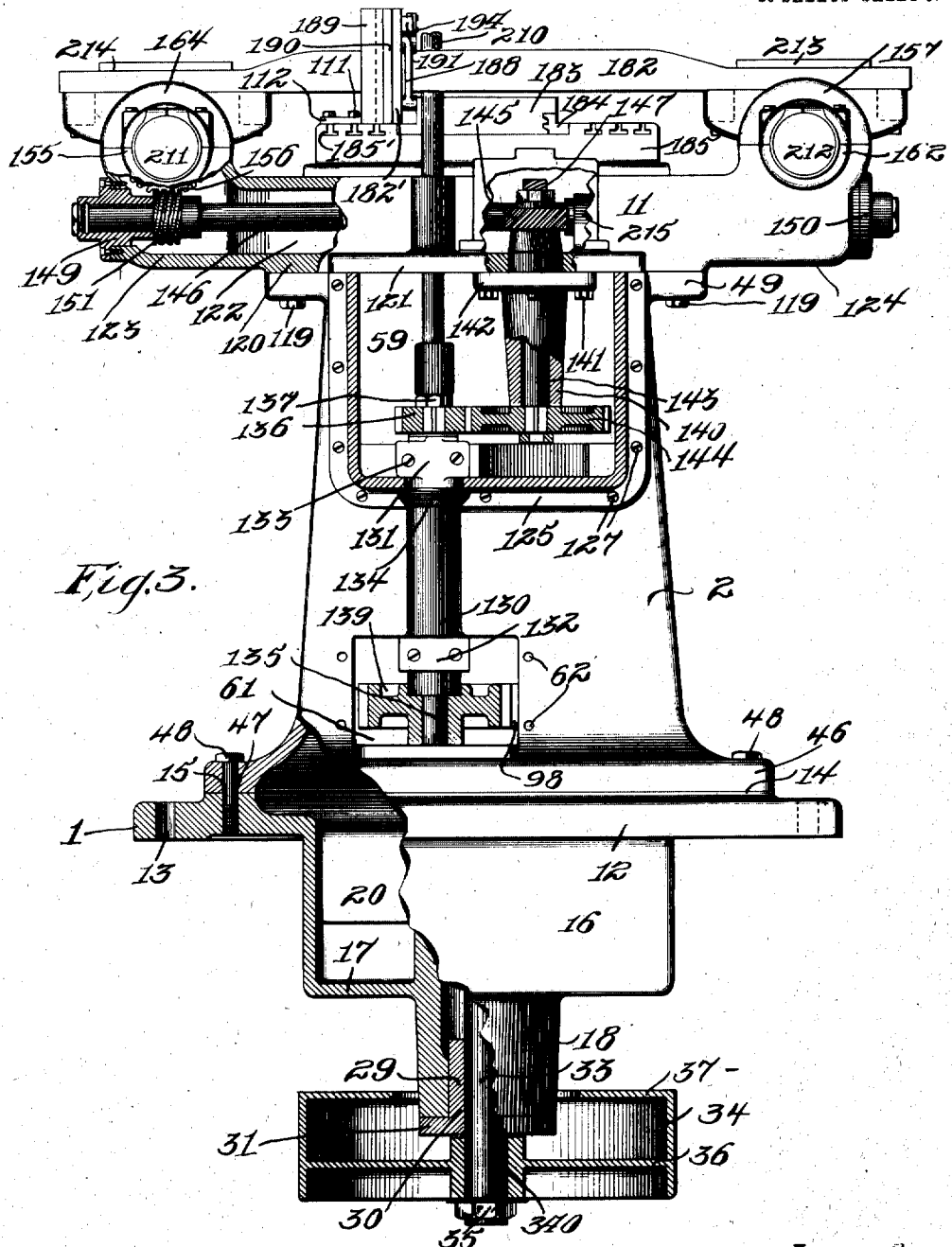
Figure 4:
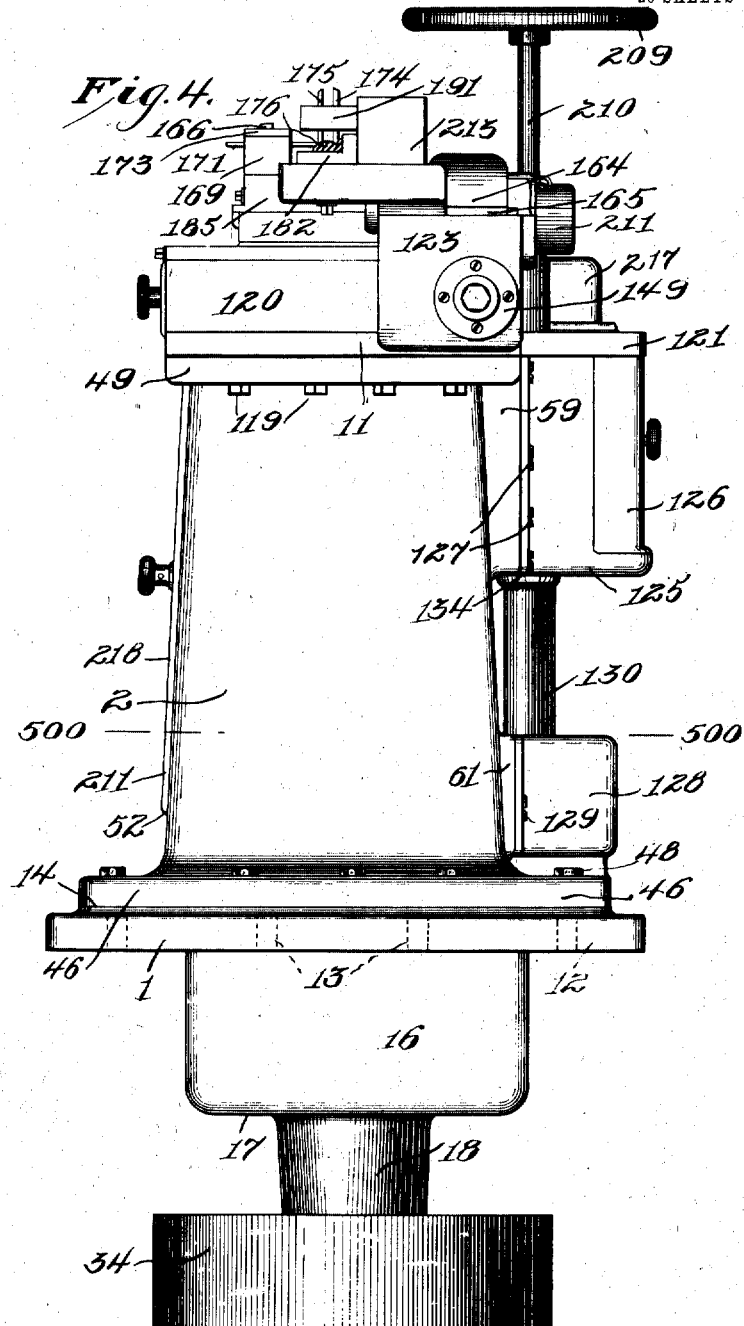
Figure 5:
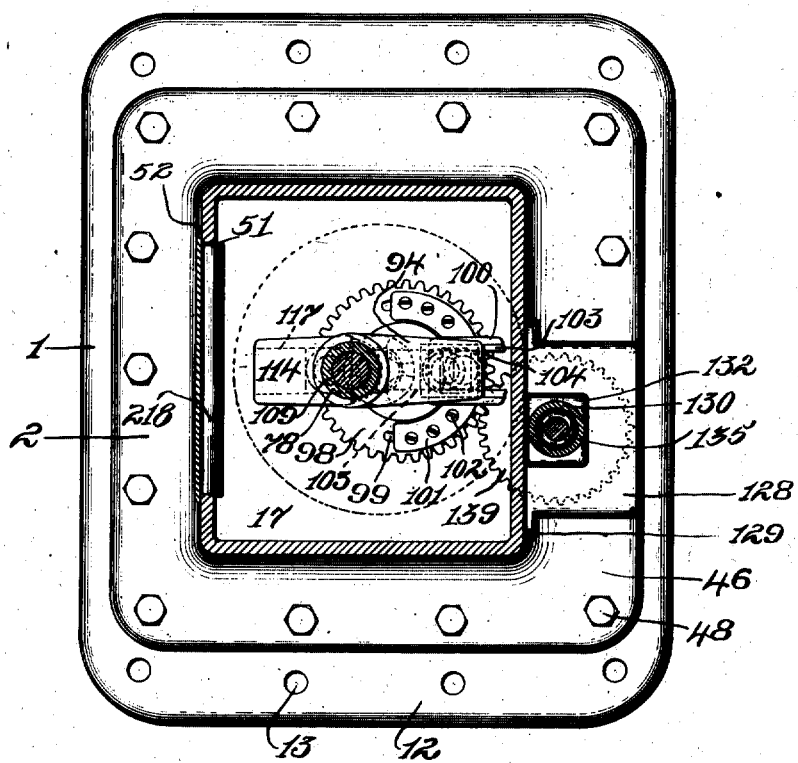
Figure 6:
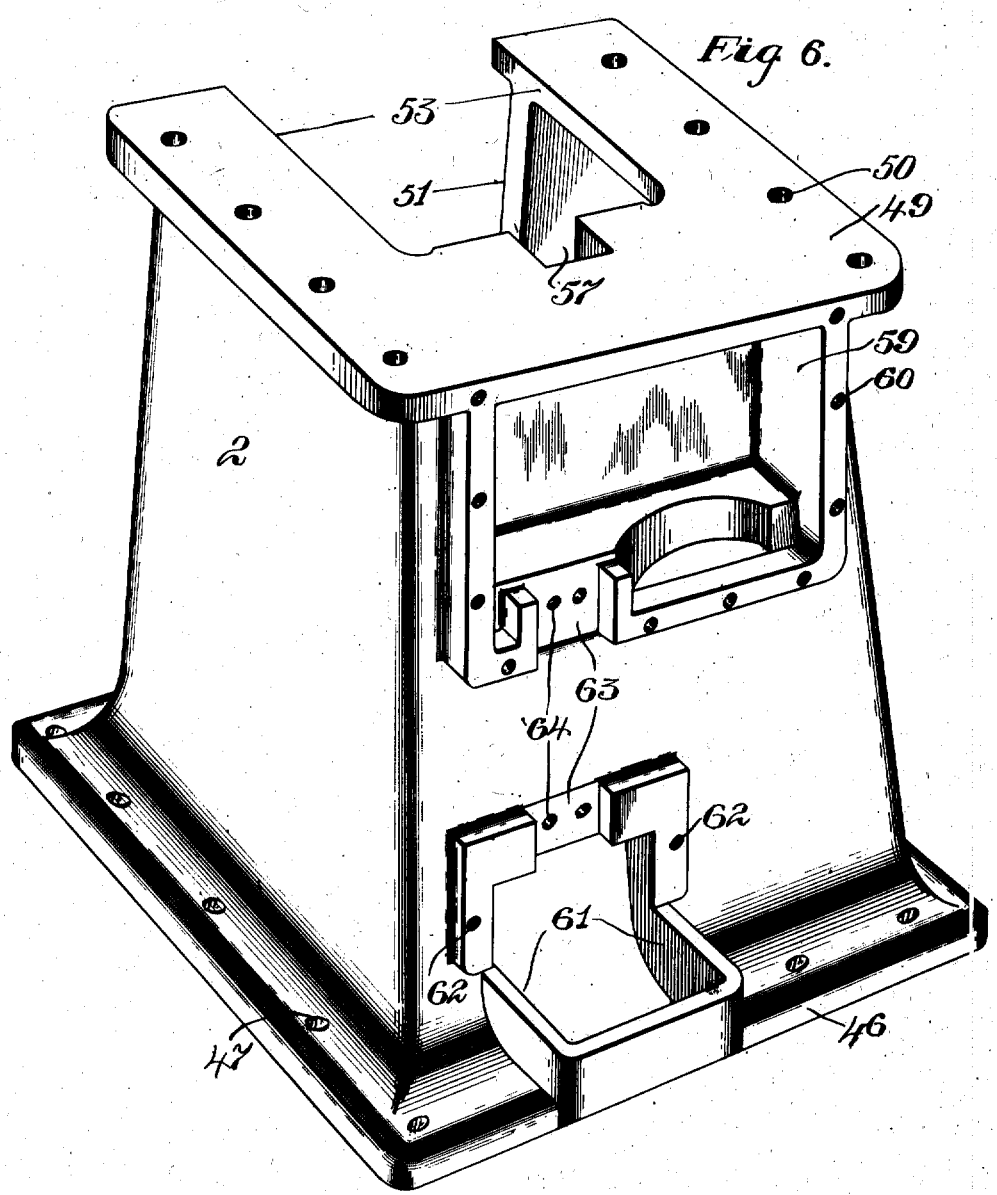
Figure 7:
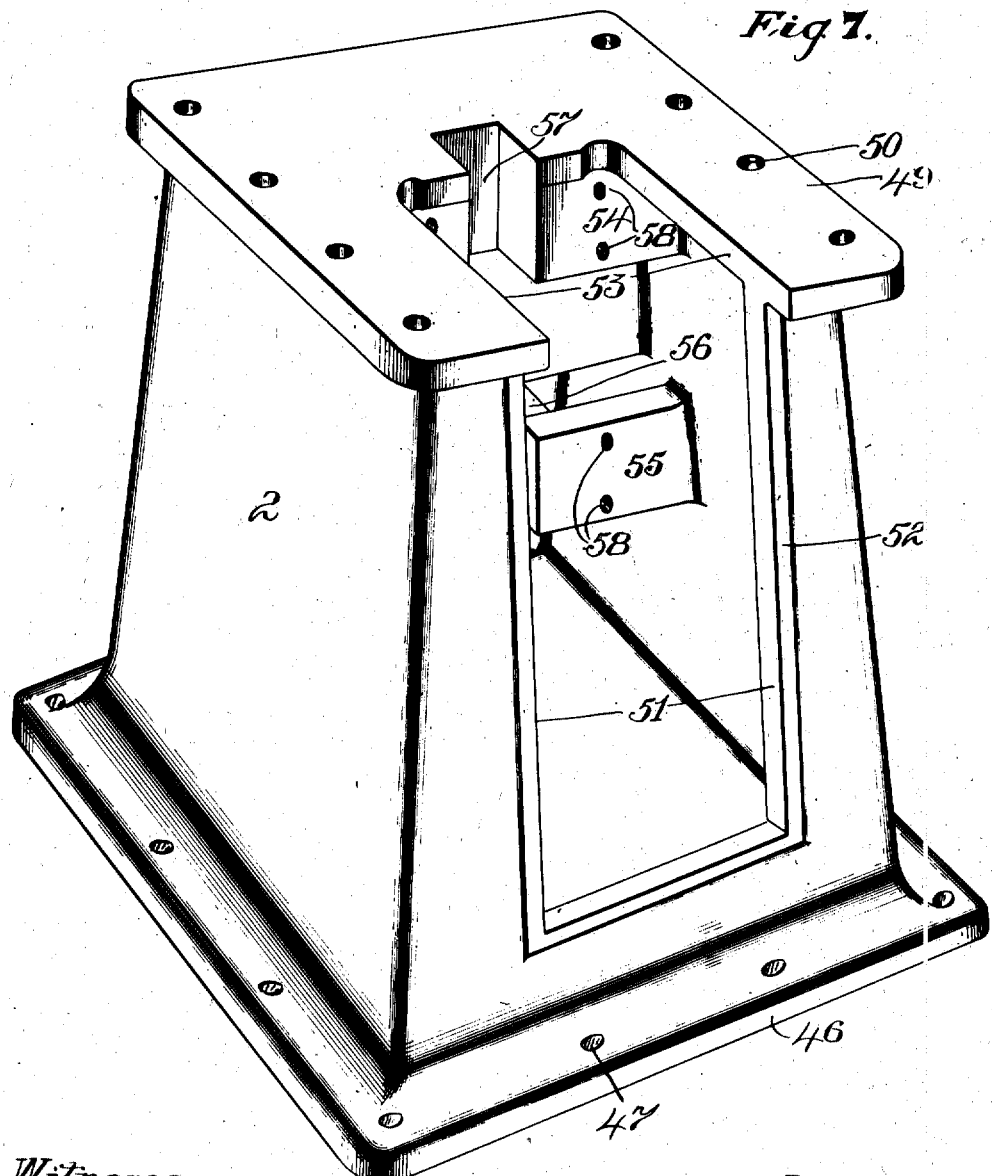
Figure 11:
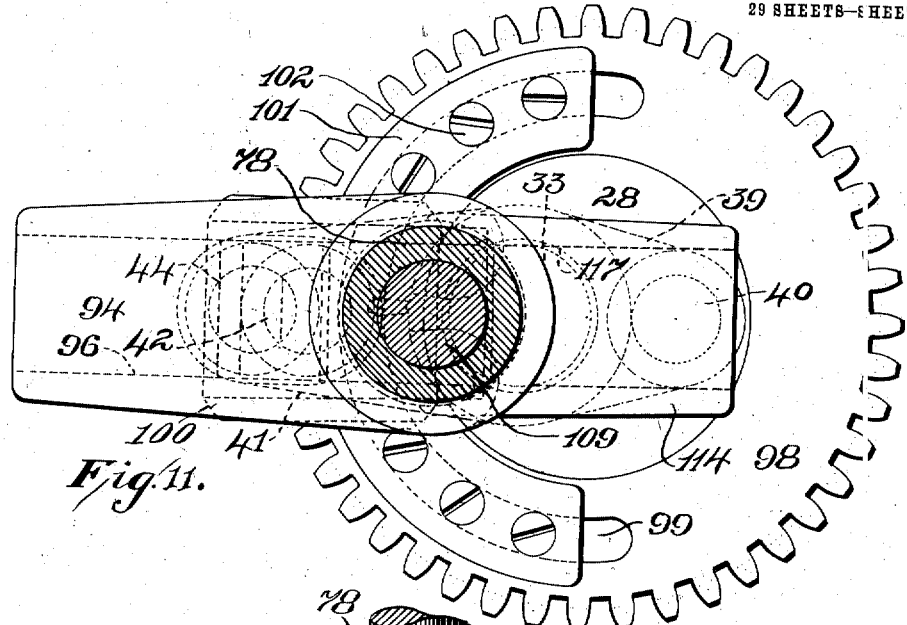

Figure 1 is an elevation embodying the mechanism for carving moldings. Fig. 2 is an elevation thereof partly broken away and partly in section, the better to disclose certain of the internal features of construction. Fig. 3 is a similar view but from a different direction showing features of construction not seen in Fig. 2, the hand wheel seen in the other figures is removed. Fig. 4 is an end elevational view of the machine as seen from the left hand side of Fig. 1. Fig. 5 is a top plan view partly in horizontal section taken at about the line 500—500 of Fig. 4. Fig. 6 is a perspective view of the frame casting of the machine. Fig. 7 is a similar view thereof but seen from the opposite side from that disclosed in Fig. 6. Fig. 8 is a perspective illustrating the top of the lower portion of the frame and bearing members of the device. Fig. 9 is a perspective view of the underside thereof. Fig. 10 illustrates in detail perspective a train of gearing from the main driver to the feeding device, in the present instance, rolls. Fig. 11 is a top plan view of certain features for producing variable movement of the main carrier and the tool slide or tool carriage transversely reciprocatory thereon, the main carriage will be moved in a path parallel with the path of stock feed movement and the tool carrying slide or carriage will be moved transversely of such path. Fig.

Figure 12:
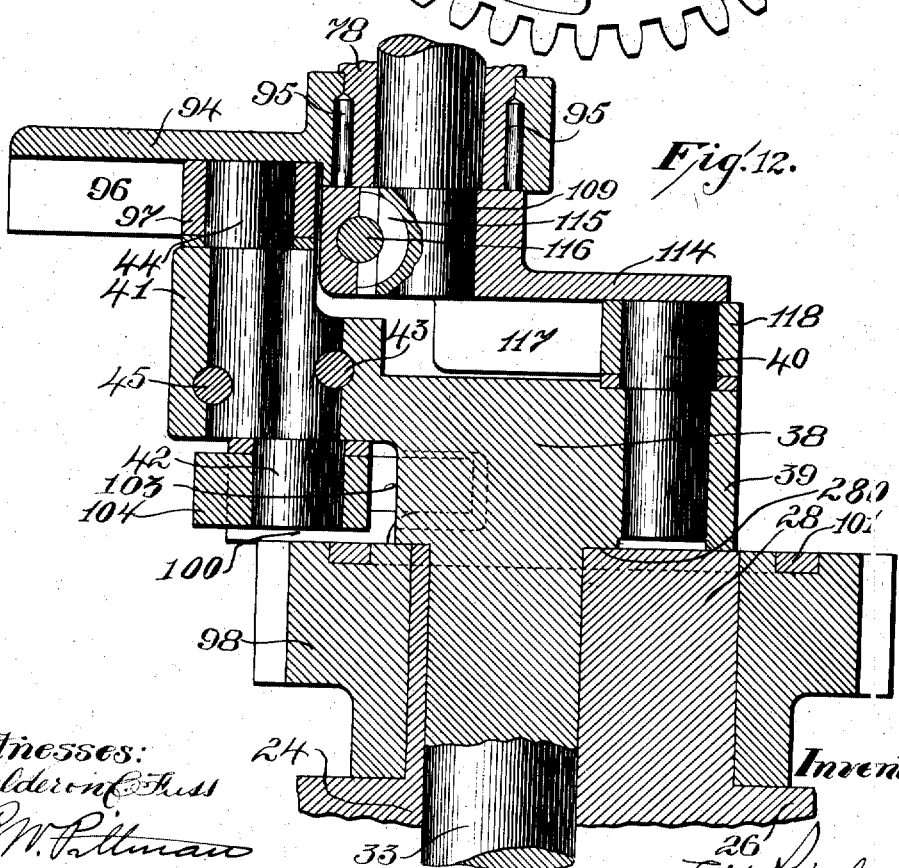
Figure 13:
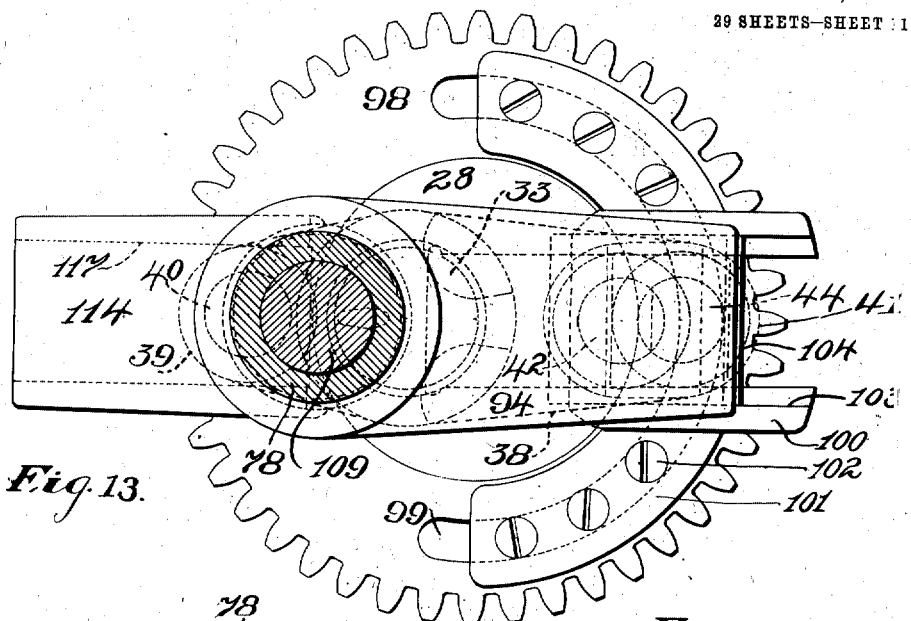
Figure 14:
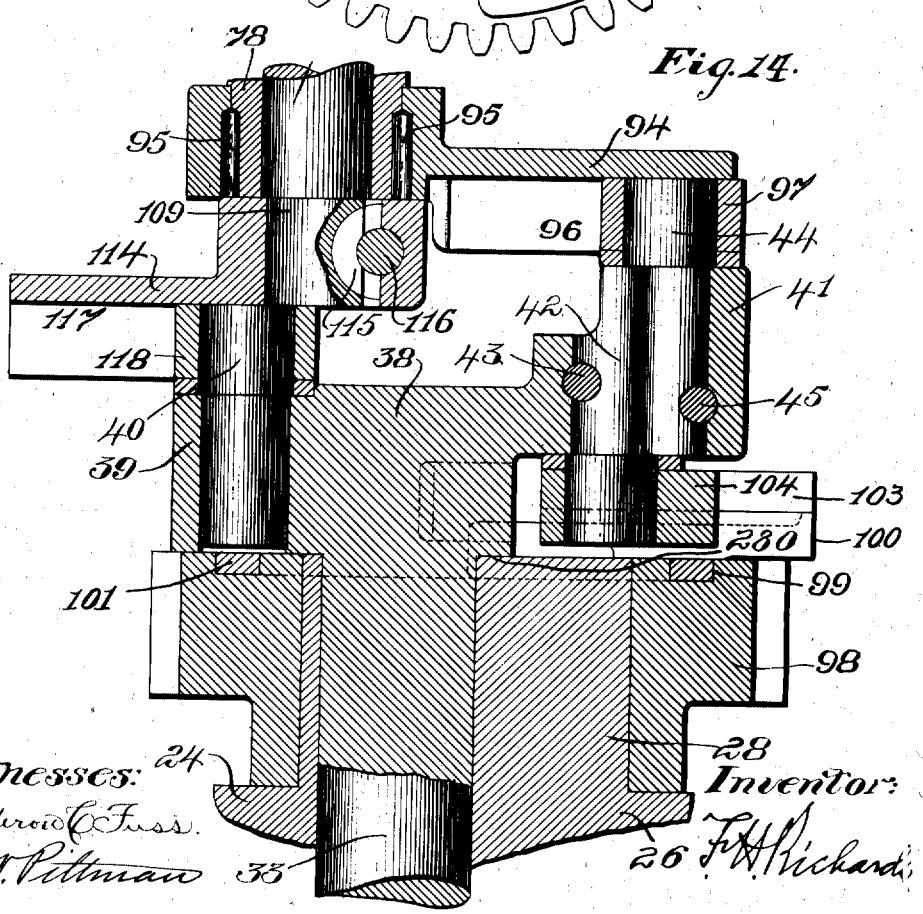
Figure 31:
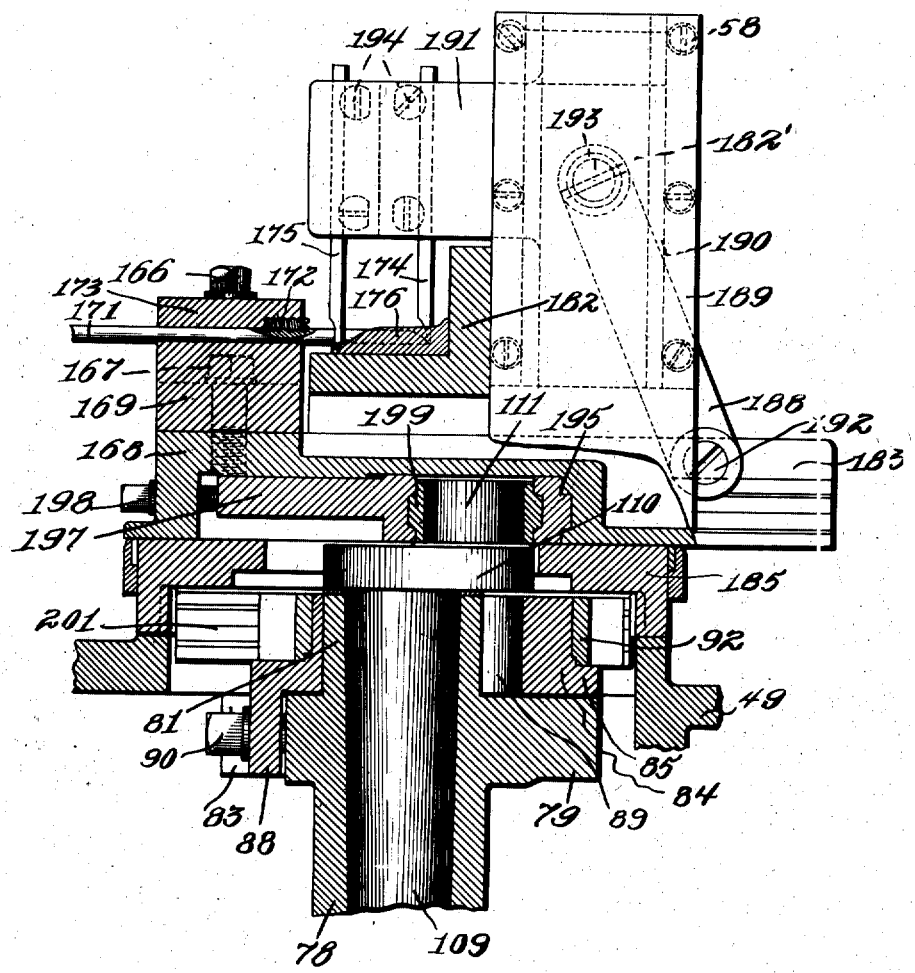
Figure 32:
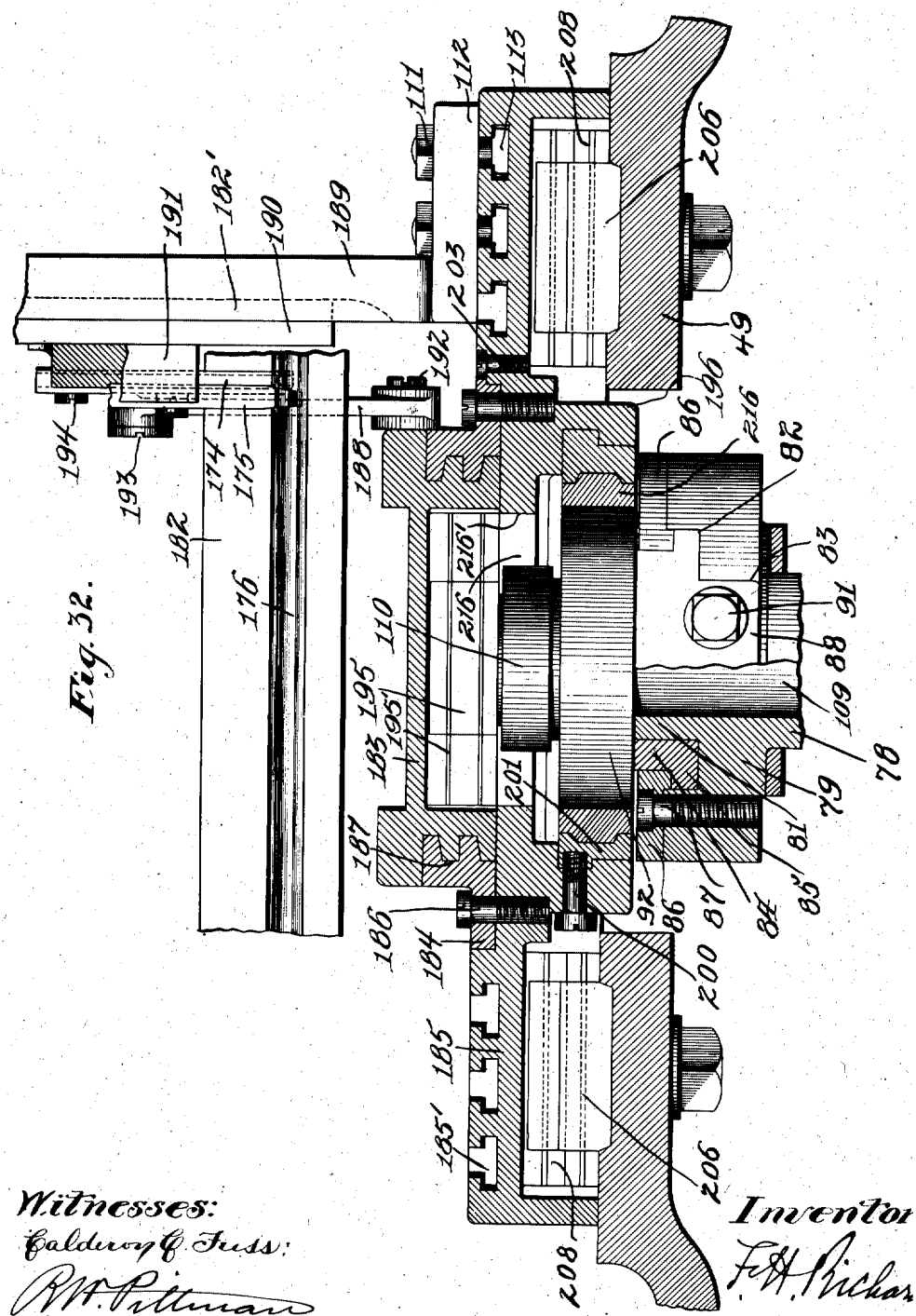
Figure 33:
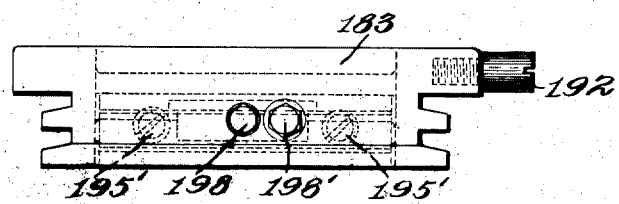
Figure 34:
Figure 35:
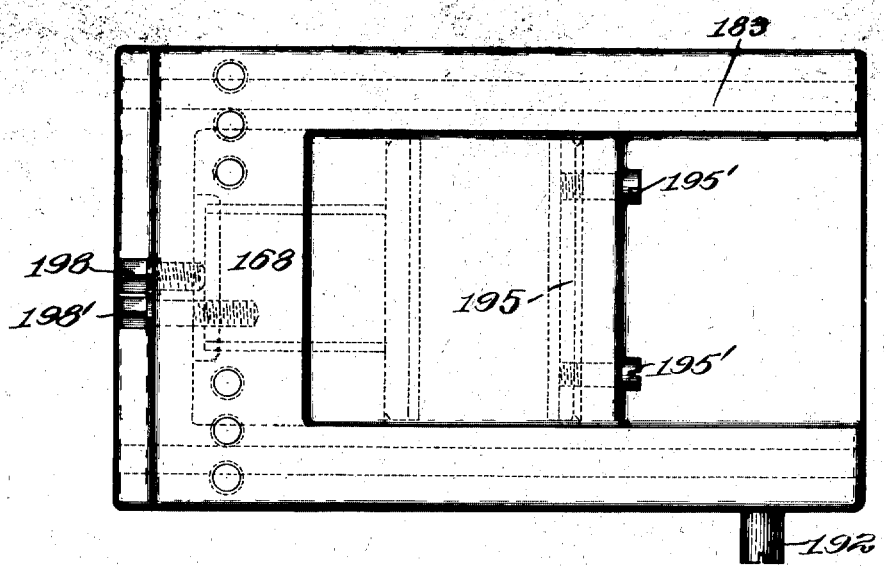
Figure 36:
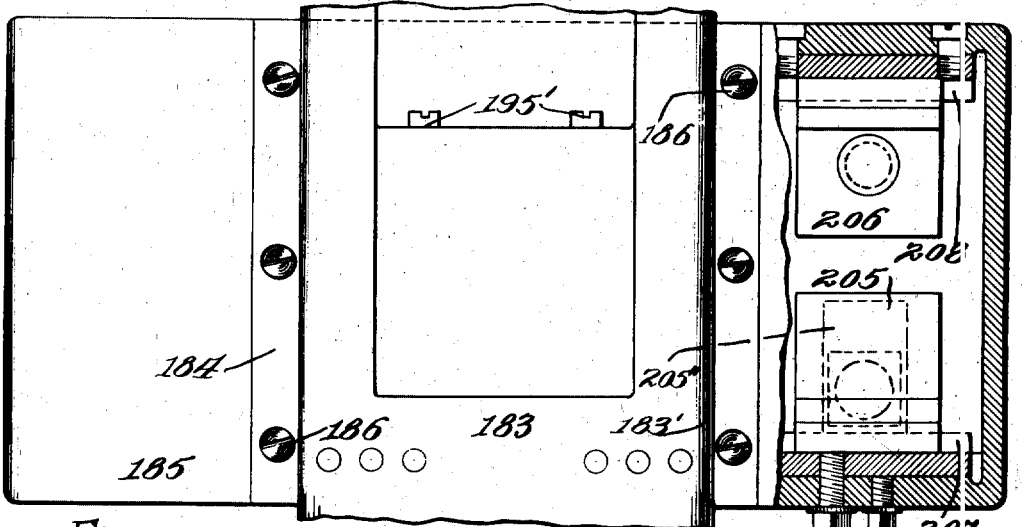
Figure 37:
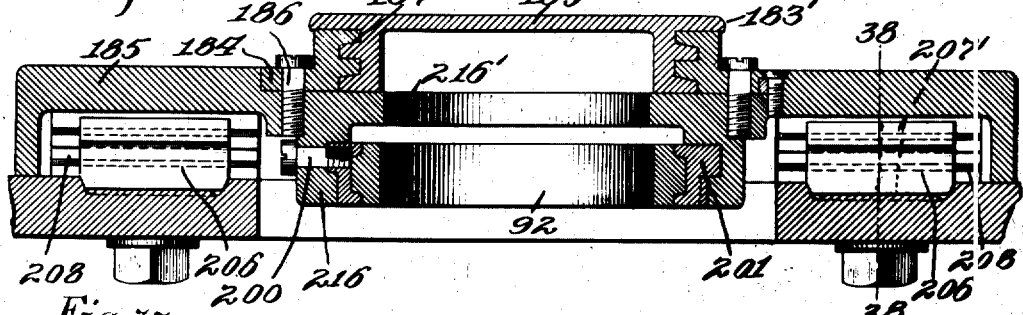
Figure 38:
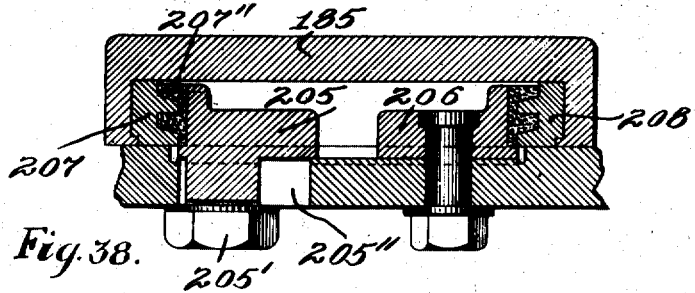
Figure 41:
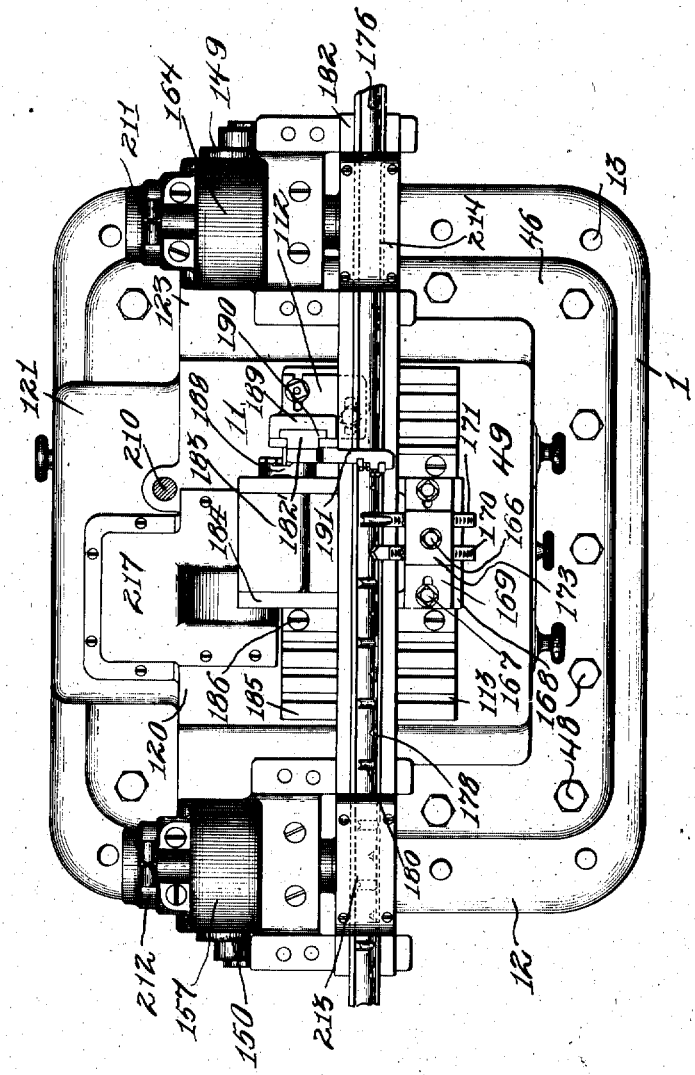
Figure 46:
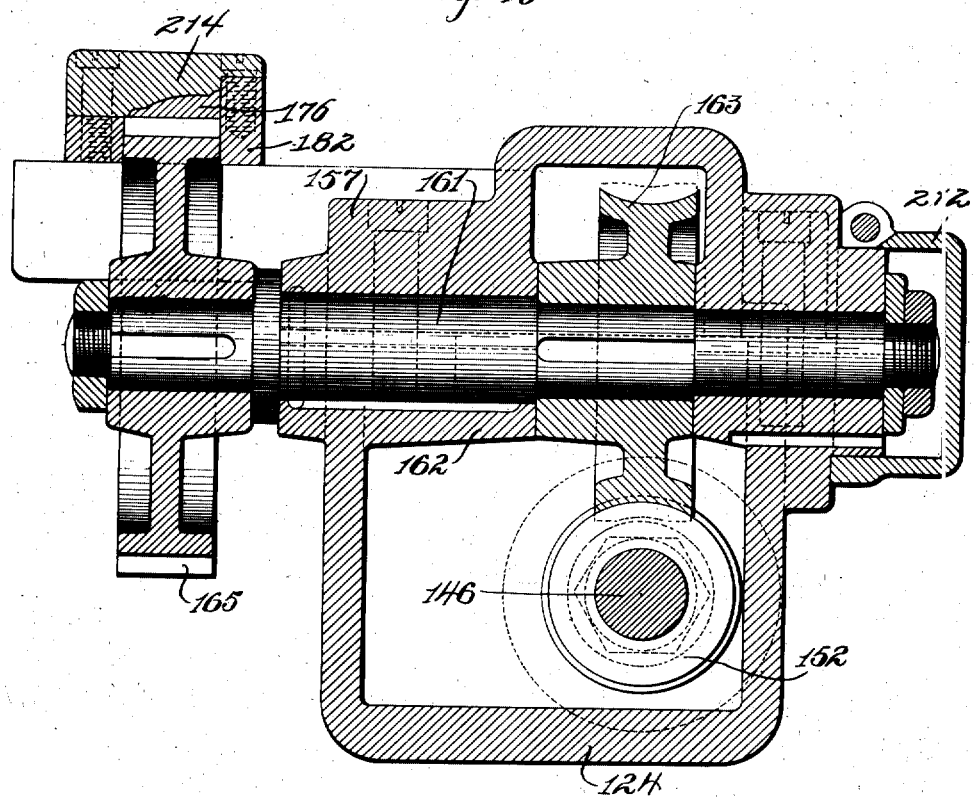
Figure 53:
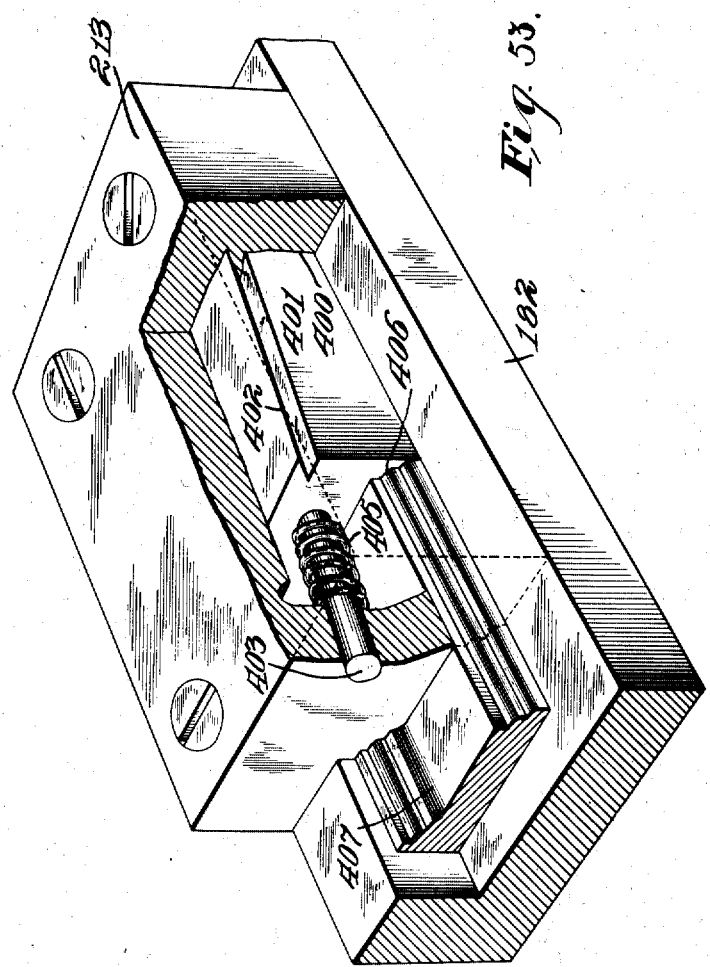
Figure 55:
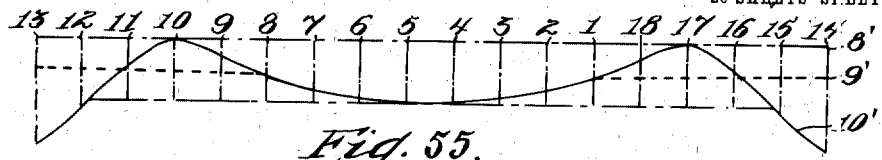
Figure 56:
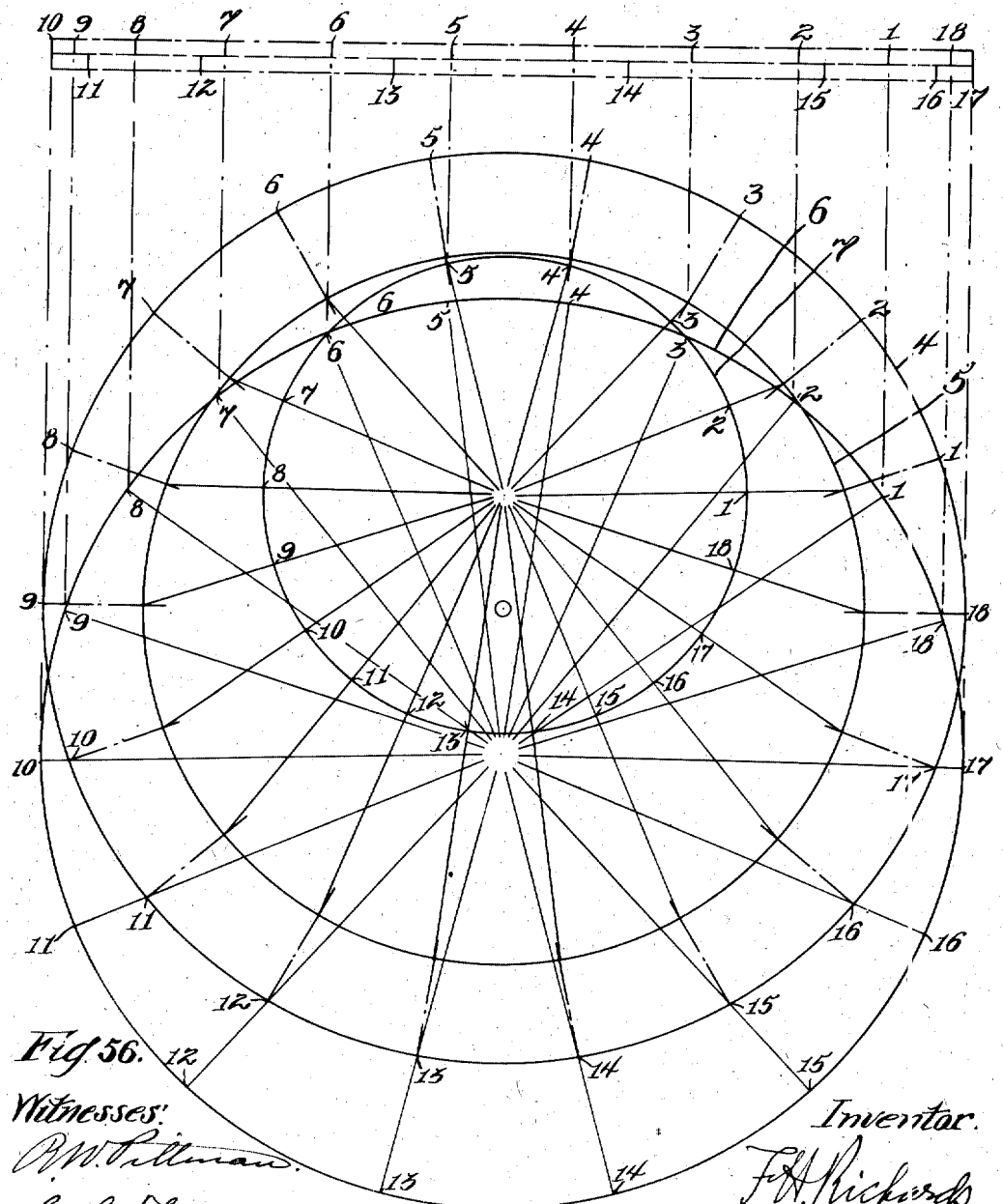

12 is a central vertical sectional view thereof. Fig. 13 is a view similar to Fig. 11 showing the parts in the diametrically opposite position to that shown in Fig. 11. Fig. 14 is a view similar to Fig. 12 showing the parts in the position they are in in Fig. 13. Fig. 15 is a plan view of the same parts showing them in different relative positions. Fig. 16 is an elevation partly broken away and partly shown in vertical section of the main driving shaft and its connected cranks. Fig. 17 is a top plan view thereof. Fig. 18 is an elevation partly broken away and partly in vertical section of one of the driving shafts together with its cranks. Fig. 19 is a top plan view thereof. Fig. 20 is a section on the line 20—20 of Fig. 19 looking down and illustrating a manner of keying a crank to a shaft. Fig. 21 is a side view of a form of key for this feature. Fig. 22 is an edge view of the key illustrated in Fig. 21. Fig. 23 is a central vertical section of the highly driven shaft for affording a connection between the main driving shaft 33 and the main carriage, and when the parts are assembled the shaft illustrated in Fig. 18 is disposed within the hollow bore of the shaft illustrated in this view. Fig. 24 is a vertical section of the upper portion of the parts seen in Fig. 23, but at a different angular position and illustrates a crank device through which the slides act. Fig. 25 is a top plan view of the crank illustrated in Figs. 23 and 24. Fig. 26 shows partly in elevation and partly in section one of the members of said crank mechanism. Fig. 27 is a top plan view of the parts illustrated in Fig. 26. Fig. 28 is a front view of bearing members for the shaft illustrated in Fig. 23, and are seen in position in Fig. 2. Fig. 29 is a side view thereof and Fig. 29ª is a top plan view. Fig. 30 is an end elevation illustrating the tool carriages and the crank for actuating the same. Fig. 31 is a similar view but showing the parts in vertical section, the plane being through the axis of the shafts illustrated in Figs. 23 and 18. Fig. 32 is a view of the same parts but in a plane transverse to the plane of Fig. 31; but also in the plane of the axis of said shafts. Fig. 33 is an end elevation of the slide for actuating the tool slides or carriages. Fig. 34 is a central sectional view thereof in a plane at right angles to the parts in the position illustrated in Fig. 33; and Fig. 35 is a top plan view thereof. Fig. 36 is a top view partly in horizontal section of the main slide and also shows in plan view a portion of the cross slide. Fig. 37 is a longitudinal section of the main slide and a cross section of the cross slide. Fig. 38 is a cross section at about the line 38—38 of Fig. 37 showing the adjustable gibs constituting the ways for the main slide. Fig. 39 is a front view of the main slide showing the various gibs in place. Fig. 40 is a top plan view thereof, in both of which latter views the cross slide is shown. Fig. 41 is a top plan view of the machine illustrating a piece of molding as being operated upon by transversely actuated knives. Fig. 42 is a top plan view of the casting for the upper member of the frame or bed. Fig. 43 is a transverse section through the bearing supporting member for the journals of the feed rolls. Fig. 44 is an end view thereof partly shown in section. Fig. 45 is a view thereof from the opposite side from that illustrated in Fig. 44. Fig. 46 illustrates in an axial plane one of the feed wheels or coils and its worm wheel by which it is actuated, and the molding or stock together with the guide therefor is shown in cross section. Fig. 47 is a perspective view of one of the tool heads detached with the knives or tools shown in position. Figs. 48 and 51 are perspective views of knives which may be employed with such tool head. Fig. 49 is a cross sectional view thereof on the line X—X of Fig. 48. Fig. 50 is a perspective view of a piece of stock illustrating transversely acting tools together with the work that they are performing upon the stock. Fig. 52 is a longitudinal section of one of the tools and the cross section of the tool head illustrating a manner of locking the tools in their proper positions. Fig. 53 is a perspective view partly broken away of a guide for the stock molding. Fig. 54 is a diagram delineating the path of movement of the tools and crank mechanism by which the tools are operated, and shows the coincidence between the main slide and cross slide; and Figs. 55 and 56 are diagrams illustrating coincidence of movement between the main slide or carriage and the feed mechanism.

The frame of the machine in the present illustration comprises a base 1 having in the present instance a rectangular flange 12 which is adapted to rest upon the floor of the shop, and is provided with bolt holes 13 whereby the machine may be securely bolted in position. The base may be provided with a seat 14 having bolt holes 15 to receive bolts 48 for holding the main portion 2 of the frame in position. A receptacle 16 for lubricant depends from the base and may be cast therewith, and in about the center of the lower portion 17 of said receptacle is formed a shaft bearing 18 perpendicularly disposed, and which projects upwardly from said bottom 17. The bearing support 18 is provided with a bore for receiving the bearings for the main shaft, as will presently be described. Certain webs 20 extend from the side walls of the receptacle member for affording rigidity to the support. Upon the upper end of the support 18 is mounted a flange 21 of circular form which is disposed eccentrically of the bore 19 of said support.

The portion 2 of the frame, which in the present instance constitutes a casing and is also shown as substantially rectangular, is provided with an outturned flange 46 which, as before described, is secured to the base 1. The casing is also provided with a platform 49 at its upper portion which is shown projecting outwardly beyond its wall and forming a flange. A door aperture 51 is provided in one side wall of the casing, and a slightly raised portion 52 is provided about such door aperture, forming a jamb for a door 218. The top platform 49 has an aperture 53 connecting with the door aperture 51 in the side wall of the casing 2 and running back a width equal to the aperture 51 to a point a little beyond the center of the platform 49. The bracket or beam 54 is formed in the casing and reaches substantially to the edge of the aperture 53, and the bracket or beam 55 is formed across the interior of the casing beneath the bracket 54.

The extension 59 is formed in the outer wall of the casing 2 opposite the door aperture 51 and adjacent to the top of the casing, the edge of such extension is shown flush with the edge of the top platform 49. In the same wall there is also formed an extension 61 which opens to the interior of the casing, the walls of the upright portion of which extension extend outwardly from the side wall of the casing flush with the edges of the wall of the extension 59 and the top platform 49. The driving shaft 33 is provided with a suitable pulley 34 removably held to it by means of a nut 35, and which pulley will be driven by a belt from some suitable source of power, not shown. The pulley is shown as having a continuous flange 36, thus making a receptacle of the interior chamber of the pulley, which receptacle may be partially covered over by flanges 37. This may be utilized for catching drippings of lubricant from the machine, the lubricant running down within the chamber 16 and part of it running down within the pulley. The lubricant will be disposed of in some suitable manner as desired. The bearing 24 is provided for the upper portion of the main driving shaft and has a portion 25 in the nature of a bushing which fits into the bore 19 of the bearing support 18, and which member 24 is provided with a bore eccentric to its outside and also eccentric to the bore 19. Above the bushing portion 25 a bearing member 24 is provided with a flange 26 eccentric to the bore of said bearing and rests upon and is secured to a flange 21 of the support 18 by means of some suitable bolts 27. The bearing member 29 is located in the lower portion of the bearing support 18 and has a bushing portion 30 and a flange 31 which flange fits against the lower face of the support 18 and is secured to such support by some suitable bolts 32 fitting into bolt holes 23. The bearing 29 is provided with a bore concentric to the bore of the support 18, and which bore alines with the bore of the bearing 24. The driving shaft 33 is mounted in the bearing members 24 and 29 and the upper end of such shaft projects above the stud portion 28 of the bearing 24, (see Figs. 12 and 14), and is formed at that point into a two arm crank 38 having a hub or shoulder 280 bearing upon the upper surface of the stud 28 which will support the shaft 33 and the driving pulley 34 from downward movement. The hub 340 of the driving pulley 34 abuts the lower end of the bearing 29 to prevent vertical upward movement of the shaft 33. The crank 38 has a short arm 39 which is provided with a wrist pin 40 and the crank also has a long arm 41 which extends from the crank in a plane above the plane of the arm 39 and is so located as to leave a space between its lower face and the upper face of the stud 28, and is provided with a wrist pin 42 which projects downwardly and is secured in position by a pin key 43. A second wrist pin 44 is also mounted in the arm 41, but in such a position that it will have a greater radius of revolution than the wrist pin 42 and projects upwardly from said arm, such latter wrist pin 44 may be secured in some suitable manner, as by means of a pin key 45. The wrist pins 40, 42 and 44 will be mounted in alinement on a single diameter of the crank 38.

A bearing casing 3, illustrated more particularly in Figs. 28, 29 and 2, is provided for the shafts for actuating the main carriage and the tool carriages and which comprises a casing portion or framework 3 and comprises a member 65, in the present instance rectangular, at the top and bottom ends of the front face of which are formed bearing members 70, the caps 72 for forming with the members 70 the bearing 71, may be held in place by suitable bolts 73. This bearing casing may be secured to the brackets 54 and 55 by bolts 77. Within the bearing members 70—72 there is provided upon each side a wedge shaped gib 75. Each of the gibs 75 having an angular portion, or a portion angularly disposed to the wedge portion of the gib, which are provided with a pair of adjusting screws 76 and 760. One of said screws, as 760, having a flange bearing upon the angle portion of the gib, the screw passing loosely through a hole in said angle portion and threaded into the bearing 72, and the other screw, as 76, being threaded through said angle portion. These wedge bearing gibs are provided to take up the wear of the bearings 72. A hollow shaft 78, (see Figs. 2 and 23), is mounted in the bearings 72, and according to the present construction the outside diameter of said shaft 78 is slightly greater at its upper portion than it is at its lower portion in order that it may fit the upper and lower portions of the bearings 72, the upper of such bearings 72 being made greater in diameter than the lower bearing to facilitate the insertion of such shaft 78. Upon the upper end of the shaft 78 is formed an adjustable eccentric, (see Figs. 24, 25, 26 and 27). A concentric flange 79 is formed upon the upper end of the shaft 78, preferably integral with said shaft and the under surface of which flange abuts the upper face 80 of the upper bearing 72. A washer 800 is shown interposed between such faces to reduce the friction between the parts. The shaft 78 projects at 81 above the flange 79 and guideways 82 are formed in the upper surface of said flange and embrace the projecting portion 81 of the shaft. The flange 79 is cut away at 83 forming a recess at one end of the guideways 82. An eccentric 84 having a rectangular base 85 is mounted to slide in the guideways 82 and is confined in said guideways by gibs 86 secured to the flange 79 by screws 87. Such rectangular base 85 has a downwardly projecting apron 88 which depends into the recess 83 in the flange 79. The eccentric 84 and its base 85 are shown as having a central longitudinally elongated slot 89 for the accommodation of the projecting portion 81 of the shaft 78 when the eccentric 84 and its base 85 are mounted in the guideways 82. This slot 89 is of such length that the eccentric 84 may be moved in the guideways 82 from a position concentric to the shaft 78 to such a position of eccentricity as may be required for varying the movement of the tools and the slide controlled thereby. An actuator 92 is mounted on the hollow shaft 78 and is eccentric with respect to the axis of such shaft and may be varied by the adjusting set screw 90, which adjusting screw is threaded in the depending apron 88 and is adjustable so that its end will abut against the inner wall of the recess 83 of the flange 79. Said apron also carries a screw 91 which is threaded into the flange 79 at the base of the recess 83 and by the manipulation of these screws various degrees of eccentricity of the member 84 relative to the shaft 78 may be obtained. A hardened collar 92 may be fitted on the eccentric 84 and secured thereto by some suitable means, which collar will constitute the actuator portion heretofore alluded to and will engage some suitable face upon the main carriage or slide.

The shaft 78 extends below the lower bearing 72 and is provided upon its lower end with the crank 94, which may be secured by keys 95, (see Figs. 2, 12, 14 and 23), and which crank is set at an angle of about 90° with the longitudinal axis of the guideways 82 of the adjustable eccentric. Crank 94 is provided with a radial guideway 96 in which is slidably mounted a block 97, and the upstanding wrist pin 44 carried by the longer arm 41 of the crank 38 is mounted in such block 97, by which means if the driving shaft 33 is driven at a uniform velocity the shaft 78, which is mounted eccentric thereto, will be rotated at constant varying velocities due to the eccentricity of the path of revolution of the wrist 44 to the shaft 78 and the relative retardation and acceleration of the wrist 44 in receding from and approaching the axis of the shaft 78; but the shaft 78 and the shaft 33 will complete their retardations coincidently but with constantly varying velocities.

The bore 105 of the hollow shaft 78 is enlarged at 106 forming two end bearings 107 and 108. The upper bearing 107 is preferably tapered, while the lower bearing 109 may be provided with a straight cylindrical portion, and in these bearings a shaft 109 is mounted, (see Fig. 18). The shaft 109 is for the purpose of reciprocating the tool carrying slides across the main slide or carriage. The shaft 109 carries a crank 114 which is secured to it by means of a key 115, which may in the present instance on side view be made semicircular, having slanting faces 115' for engaging a taper slot cut in the shaft and slanting faces 115'' for engaging faces cut in the hub of the crank, such faces being disposed at a slot 116' which will be closed up upon the key by means of a suitable bolt 116. The tendency of the crank to move angularly upon the shaft will be prevented by this key and such tendency toward movement will bend the key more strongly to its work. The crank 114 is provided with a guideway 117 disposed radially of the shaft 109 and in which guideway is mounted a block 118 adapted to reciprocate along such guideway and in which block a bearing is provided for the wrist pin 40 of the crank 39 carried by the main shaft 33. In the present organization and timing of the machine the cranks 94 and 114 are disposed on substantially diametrically opposite sides of the axis of the shafts 109 and 78. Of course the relative angular position of these cranks will show during each cycle of movement, yet for a better construction of the machine it is deemed advisable to locate them so that their relative positions will be opposite. When the shaft 109 is mounted in the bearings provided therefor in the hollow shaft 78 and the crank 114 is controlled by the wrist 40 it will be seen that such shaft will be eccentric to the driving shaft 33 and will be driven after substantially the same manner as the driving of the shaft 78. The axis of the shaft 109 is the same as the axis of the shaft 78 and the center of the crank arm 39 is the same as that of the crank arm 41, but is shorter and the angular variation of velocity for the shaft 109 will be different than it is for the shaft 78. According to the timing of the parts as herein illustrated the cranks on the shafts 109 and 78 are so disposed relatively to the feed movement, to be hereafter described, that the tools will be given a rapid movement forward and back during the coincidence of movement between the main carrier and the feed slide. The path of the movement of the tools forward and back which will bring them into the path of the feed, which tools will be knives, will be within the profile of the stock. Their movement will be rapid to give a better cutting action and during the time they are within the profile there will be the coincidence of movement of the feed and the main slide.

A table 11 for supporting the stock guiding means, the various carriages and the stock feeding means is secured to the platform 49 of the casing 2 by means of bolts 119. The main carriage or slide 185 is mounted upon this table, which slide carries the cutting knives and other operating mechanism and is mounted for reciprocation in a path parallel to the path of movement of the stock. The ends of the slide are provided with slideways 207 and 208 which are engaged by gibs 205 and 206, the gib 205 being held in place by means of a suitable nut 205', there being provided a slot 205'' so that this gib may be adjusted back and forth and also moved out of engagement with the slideways so that the slide may be removed bodily from the machine by merely unscrewing two nuts. The slideway may be provided with a recess as indicated by the dotted line 207' in Fig. 37, and in which may be situated some suitable oil wick 207'', as for instance a piece of felt. The slideways 207 and 208 are mounted upon separable blocks which may be secured to the slide by some suitable means, as for instance screws. The slide thus mounted may be reciprocated back and forth through its path of movement, and for the purpose of such reciprocation the eccentric wrist as it were 84 of the shaft 78 having upon it the wear resisting shoe 92 engages the circular walls 216' of a slide 216 which is capable of transverse reciprocation on the main slide and is mounted in bearing members 201 forming guideways for it and supported adjacent to the central portion of the main slide and may be held in place by suitable screws as 200. Upon the revolution of the wrist 84 the main slide will be reciprocated back and forth, the slide 216 moving across the main slide for the purpose of compensating for the lateral movement of the wrist pin, so that the only movement tending to reciprocate the main slide will be impaited to it. The amount of the respective excursions of the main slide will be adjusted by adjusting the slide 185 in the main above alluded to, which will increase or diminish the eccentricity of the member 84 relatively to the shaft 78. The variable movement which is imparted to the shaft 78 will through the connections above referred to be transferred to the main slide. Upon this main slide is mounted the tool carrying members, the upper face of the slide being provided with suitable undercut grooves 185' for receiving the heads 113 of bolts for bolting down the standard 189 which carries the tools and their actuating mechanism, and is provided with a feet portion 112 which will be held down by means of nuts 111 on the bolts. The support 189 has guideways 190 vertically disposed upon the machine and in which is mounted for reciprocation the carriage 182'; the guides 190 are in the present instance held in place by suitable screws 58. The carriage 182' carries a tool head 191 in which are mounted some suitable knives 174 and 175 held in place in the present instance by screws 194 in such a position that upon the reciprocation of the carriage they will incise the stock 176.

The cross slide or carriage 183 is carried in guides 184 having recess 187, and which guides are held in place by some suitable screws 186. These guides or recesses are transversely disposed to the guides 207. The wrist 111 carried by the crank 110 of the shaft 109 finds a bearing in a slide 199 which is mounted to reciprocate transversely of the cross slide in a guideway member 195 which is adjustably held in place in such cross slide by means of screws 195' and set screws 198—198' carried by the cross slide. The rotation of the shaft 109 and the revolution of the wrist 111 will reciprocate the cross slide transversely of the main slide and during such reciprocation the movement of the wrist laterally of the line of such reciprocation will be compensated for by the movement of the slide 199 in its ways. The edge of the slide 183 may overhang its ways as at 183' for preventing the entrance of dirt to the bearing surfaces.

According to the manner of organization of the machine herein illustrated the tools just described, 174 and 175, will incise the stock in a vertical direction and other tools will be provided for incising the stock in a horizontal direction. The cross slide in the present instance carries the stud 192 connected with a stud 193 upon the carriage 182' by means of a link 188 so that the reciprocation of the cross slide will reciprocate the slide 182' and consequently move the tools toward and from the stock, which will rest upon the stock guide 182. The horizontal reciprocatory tools 170 and 171 are carried by a head 169 which will be bolted by bolts 167 to the portion 168 of the cross slide whereby these tools are moved directly toward and from the stock and the stock guide by the reciprocation of the cross slide. The tools are caused to move toward and from the stock simultaneously and at a variable speed due to the speed varying connection between the shaft 109 and the driving shaft 33.

In the present illustration the upper faces of the tools are provided with notches 179 for receiving set screws 172 so that after the tools have been placed in the tool head under the plate 173, which will be clamped down by the set screw 166, the tools may be located in position by means of suitable screws 172, the threads of which take into the notches 179 which may be made of a pitch corresponding with such screws 172.

The stock guide member comprises an angular member 182 for receiving the stock, and the stock may be passed under suitable guides 213 and 214, and for the purpose of holding the stock securely to the faces of the support 182, the guides may be chambered out and have supported therein by means of slanting guideways 400 blocks 401 having slanting guideways 402, such blocks being shown as having a pin 403 passing out through the end of the guide and a suitable spring 405 surrounding the pin for pressing the block downwardly on the guides and against the face of the stock. The contour of the face 406 of the guide may correspond with the contour of the face 407 of the stock. By this means a yielding support is afforded which will accommodate unevenness in the stock without interfering with the proper running of the machine.

The tool 174 is provided with a cutting edge which will make an incision as 177, which may be regarded as scoring off an end of the cut of the edge 174' of the tool 171, which tool 171 in the present construction will make the gouge cut 180 up to the score cut 177. The tool 175 is shown as constituted for making a V-shaped incision 178, and the tool 170 is provided with a cutting face 181 for completing the ornament instituted by the scoring 178. Of course various combinations of tools for producing various portions of the ornament will be used as occasion may demand, the present showing being merely for the purpose of illustrating the manner in which the machine may operate a simple design having been selected for the present illustration for obvious reasons.

Applicant although having referred to the feed and the concurrence of the movement between the feed and the main carriage has not as yet described the means for producing the variable feed since it would have broken in upon the description of the main carriage or slide and the cross slide. The framework for supporting the shaft for driving the feed mechanism comprises a portion 120 of the table 11, having an overhang 121 which extends out over the right hand side of the machine. A casing 125 is provided with a door 126 and such casing is secured by means of screws 127 to the edge of the extension 59 of the casing 2 and also to the overhang 121, and the casing 128 is secured by screws 129 to the edges of the rectangular structure 61. A column casing 130 provided with notched ends 131 and 132 is secured to the casing 2, preferably by bolts 133, (see Fig. 3), such column casing 130 is provided with an angular lip 134 below the casing 125 for the purpose of catching drippings which run from the interior of the casing 125 through the crank between said casing and the column 130. A communicating bore 130' is provided from the interior of said lip 134 to the interior of the column casing 130 to convey the oil from the lip to the interior of the column. The column casing 130 is bored out forming bearings for the shaft 135 which is shown projecting above and below said column. Upon the shaft is removably mounted a change gear 136 adjacent to its upper end and is secured thereto by means of a suitable key and securing nut 137, the gear being situated within the chamber formed within the casing 125. The upper end of the shaft 135 where it projects above the securing nut 137 is squared as at 138 for receiving some suitable wrench 210 having a hand wheel 209, so that the mechanism within the casing may be actuated by hand from without as occasion may demand for the purpose of adjusting the stock preparatory to or during the cutting operation. A spur gear 139 is fast upon the lower end of the shaft 135 and is seated within the inclosure formed by the casing 128. The gear 139 is in mesh with a gear 98 which is shown mounted in connection with the variable speed crank mechanism. By reference to Fig. 10 it will be seen that the shaft 135 is driven from the gear 98 and that the velocities of such gear 98 are imparted to the shaft 135, which will be imparted to the feed rolls 165 and 158 by means of the gear wheel 144 on shaft 143 carrying a miter gear 145 in mesh with a miter gear 147 upon a shaft 146 mounted in bearings 215 within the body portion 120 of the table 11. The shaft 146 is disposed longitudinally of the machine and projects in both directions from the miter gear 147 and carries worms 151 and 152. The worm 151 is in mesh with a worm wheel 156 fast upon a shaft 154 and mounted in bearings 155 carried by the side arms 123, the bearing being divided to admit the shaft, and carrying a feed wheel 158. The other change worms 152 are in mesh with a worm wheel 163 fast upon a shaft 161 having suitable bearings 162 in the side arms 124, and which bearing may also be divided for the purpose of removing the parts. Caps 157 and 164 respectively are provided for the bearings 155 and 162, which caps inclose the worm wheels 156 and 163, and which are provided with dust proof members 211 and 212. The shaft 161 carries a feed wheel 165. The peripheral velocities of these wheels will be the same and will be controlled by the velocity of the gear wheel 98 through the train of gearing. A spur gear 98 is mounted for rotation upon the stud 28 carried by the shaft 33 and which stud is eccentric to the shaft 33. A channel 99 concentric with the spur gear 98 is provided in its upper face. A crank 100 is provided with a base 101 constituting a rib which is fitted into the channel 99 and is secured to the spur gear 98 by screws 102. The crank 100 is provided with a radial guideway 103 in which is slidably mounted a block 104 constituting a bearing for the wrist pin 42 carried by the longer arm 41 of the crank 38. By this means constant angular motion or velocity of the driving shaft 33 will impart to the gear wheel 98 a continuously varying velocity varying throughout each cycle or revolution, but completing a revolution with each revolution of the driving shaft, thus the driving shaft will impart a variable motion of the peripheries of the feed wheels 158 and 165, in the present instance the axis of the stud 28 which is eccentric to the axis of the driving shaft 33 is diametrically opposite from the axis of the shaft 78, which is also eccentric to the driving shaft 33, consequently the maximum velocity imparted to the shaft 78 by the driving shaft 33 through the crank connection will occur at the same moment that the minimum velocity imparted to the spur gear 98 will occur. The shaft 78 will shift the main carriage and with it the tools in a path parallel with the stock and coincident thereto in direction and in motion at a time when the stock is being moved the fastest and at a time when the main carriage is being moved the slowest. In the present organization of the machine and during such coincidence of movement the tools will be advanced into and out of the profile of the stock, and the shaft 109 by means of its crank connections will be imparting the more rapid movement to such tools transversely of the main carriage. The incisions to the stock will be inaugurated and completed during such coincidence of movement of the stock and main carriage and during the time that the tools are having their greatest transverse velocity.

The operation of the machine may be better understood by diagrammatic illustrations which are in the nature of charts in Figs. 54, 55 and 56, which show the varying velocities of the cranks. In Fig. 56 the circle 4 represents the path of the wrist 44 which is in engagement with the crank 38 on the driving shaft 33, and said circle 4 is divided into 18 consecutively numbered equal parts representing the position of said wrist 44 at each consecutive 20 degrees of angular advance of the driving shaft 33, and the rotation of the driving shaft 33 as having uniform angular velocity. The circle 5, concentric with the circle 4, represents the path of the wrist 42 carried by the longer arm 41 on the crank 38 on the driving shaft 33, and since the two wrists 44 and 42 are mounted upon the same arm 41 of the crank 38, the radii drawn to the points on the circle 4 as dot and dash lines intercept the circle 5 establishing points on said circle 5 corresponding to the points and numbering upon the circle 4. The circles 4 and 5 represent the paths of travel of the cranks, or more properly the axes of their wrists, having constant radii. The circle 6 illustrates the angular movement of the shaft 78, its radii indicating the positions of the wrist 44 in its engagement with the crank 94 on the shaft 78 during one revolution of such wrist. The radii of the circle 6 are numbered to correspond with the numbers on the circle 4 indicating the concurrent positions of the wrist 42 which determines the length of the crank 41 and the engagement of the wrist 44 with the crank 94 and which point of contact or engagement determines the length of said crank 94 which length is continuously changing for producing the variable speed reciprocation of the main carriage or slide 185. The consecutive points of engagement of the crank 94 by the wrist 44 of the crank 41 are indicated by the intersections of the circle 4 and the radii of the circle 6. The continuously varying velocities imparted to the shaft 78 are indicated by the intervals between the radii of the circle 6 drawn through the points on the circle 4. The circle 6 representing the movement of the shaft 78 may be considered as representing the path of the axis of the adjustable eccentric 84 on said shaft and the points thereon, the consecutive positions of said eccentric. The diametral movement of the adjustable eccentric 84 in a direction perpendicular to the plane of mounting of the shafts 33 and 78 is used to impart a reciprocating motion to the main carrier 185 which carries the tools in the direction of the moving stock. Therefore it is only necessary that such diametral movement be considered with regard to circle 6. This movement would be represented by the intervals between lines projected from the points indicated on the circle 6 parallel to the plane of mounting of the shafts 33 and 78. The intervals between points from the upper half of the circle 6 are above those from the points on the lower half of such circle, all of said divisions being numbered in correspondence with the points upon the circle 6. The circle 7 represents the spur gear 98, its axis being in the same plane of mounting as those of shafts 33 and 78, and the radii of the circle 7 represent the consecutive positions of engagement of the crank 100 with said spur gear 98. The consecutive positions of the wrist 42 on the arm 41 of the crank 38 on the driving shaft 33 with relation to the crank 100 are indicated by the intersections of the radii of the circle 7 by the circle 5, said radii of the circle 7 being drawn from the points indicated on the circle 5, as the crank represented by the circle 5 drives the crank represented by the radii of the circle 7. The intervals between the points of intersection of the radii of the circle 5 and the circle 7 indicate the variation of the angular velocities imparted to the gear 98. The gear 98, as before stated, is for driving the rolls which feed the stock, and the circle 7 can be regarded as representing one of such feed rolls and in this diagram I have proportioned the radius of the circle 7 to represent one of such feed rolls and the radius of the circle 6 to represent the travel of the adjustable eccentric 84, as though the adjustable eccentric 84 made one revolution to each revolution of the feed roll, though, as a matter of fact, the gearing which drives the feed rolls in the actual machine may reduce the speed of the feed rolls with regard to that of the adjustable eccentric 84 in which case the diameter of the feed roll would be proportionately increased. Considering that the circles 7 and 6 are proportioned with regard to the correct organization of the device, as just described, and the points on the circle 6, if the circle 7 be developed by placing the points 8 coincident it is found that the points 1 to 15 on said circle 7 are practically coincident, proving that the diametral movement of the eccentric 84 throughout substantially 140 degrees of the revolution of the driving shaft 33 substantially coincides with the peripheral movement of the feed roll. That is, the projection of the points on the upper or slow side of the circle 6 will practically correspond with the development of the points on the upper or fast side of the circle 7 throughout substantially 140 degrees of the circle 4. This correspondence is probably not exact, but is within a few thousandths of an inch at most of being absolutely accurate, and therefore is perfectly practicable in wood working machinery where the accumulation of error, due to many causes, is almost sure to be more than this amount. Referring to this description of these diagrams it will be seen that if a piece of stock is fed by a roll represented by the circle 7, and a carrier of any kind is reciprocated parallel to said stock by the diametral movement of the eccentric or crank represented by the circle 6, that said carrier will travel with the stock during substantially 140 degrees of the revolution of the driver.

I have also shown a time chart, Fig. 55, consisting of a base line 8' from which dot and dash perpendiculars are dropped indicating eighteen equal time divisions each representing the interval of time occupied by 20 degrees of the angular movement of the driving shaft 33. The dotted curve 9' on this chart represents the angular velocity of the feed roll and the full line curve 10', the diametral velocity of the adjustable eccentric 84. It will be seen that these two movements substantially coincide between the points 1 and 8 and it may be noted that the extremes of the diametral movement of the adjustable eccentric 84 occur at the points 10 and 17 where the motion is *nil* and the curve 10' therefore touches the base line 8'.

It will also be observed that there are three variable transmitting mechanisms, two of which, namely, those driving the shafts 78 and 109 are taken from the end of the driving shaft 33, and as the cranks 94 and 114 are in the construction illustrated never unalined at more than an angle of 50 or 60 degrees, and as it is only necessary to provide space enough within one of the driving cranks to allow said cranks to pass the hub of the other driving crank, it is comparatively easy to provide a construction capable of these functions. A third variable movement, however, may be so designed that during its rotation it shall not come in contact with the driving shaft 33, and therefore I have devised the construction shown herein wherein the hub of the third driven member, the gear 98, is of greater radius than its eccentricity to the driving shaft plus the radius of said driving shaft. The variable movement last referred to, shown diagrammatically in Fig. 54, is for the purpose of operating the cross-slide or tool-carrier 183, disposed at right angles to the main slide or tool-carrier 185, hereinbefore referred to. The circle 4', Fig. 54, represents the wrist 44, and the circle 5' the wrist 40. The axis of the wrist 40, it will be noted, is set closer to the axis of the driving shaft 33 than the axis of the wrist 44, and which wrist 40 is axially diametrically opposite the wrist 44, and the shaft 109 being located in the same axial position as is the hollow shaft 78 said shaft 109 will have a greater variability transmitted to it than will be transmitted to the hollow shaft 78 due to the position of the wrist 40 with relation to the axis of the driving shaft 33. In view of the positioning of the oppositely-disposed wrists 40 and 44, the shaft 109 will be operated at its highest velocity while the hollow shaft 78 is being operated at its lowest velocity. This is important, since the tools carried by the cross slide or carrier 183 are given a quick forward or advancing stroke while they are cutting the stock, but are given a slow movement in a path parallel with the path of stock feed movement. The path of the wrist 111 carried by the crank 110 at the uppermost end of the shaft 109, (see Figs. 31 and 32), is indicated by the circle 111', and the numerals on said circle from 1 to 18 correspond with the advancing and retracting movement of the cross slide 183, and are represented by the horizontal lines in the upper part of said Fig. 54 and have corresponding numerals. When the cross-slide or carrier 183 is at the point indicated by 1 in the circle, the tools are moving to enter the stock, indicated by 1 in the horizontal lines in the upper part of said diagram and at that time the main carrier 185 is moving in coincidence with the feed rolls 158 and 167, which move or feed the stock, the stock movement being indicated by the vertical lines. For each increment of movement of the main tool-carrier 185, as for instance, from 1 to 2, the wrist 111 will move the cross-slide 183 a distance, as for instance from 1 to 2, indicated by the horizontal lines, and correspondingly from 2 to 3 at an increased ratio of movement, terminating at the extreme end of the forward or advancing stroke from 1 to 4 and indicated by 20 of the cross-slide or carrier 183, and in a like manner is retracted, as indicated from 5 to 8 decreasing its velocity in a similar manner as the velocity was increased while advancing and entering the stock. At the point 8 the coincidence ceases, at which time the tools are drawn entirely out of the profile of the stock. While the cross-slide 183 is traversing from the points indicated by 8 to 18 and on to 1 the tools are out of the stock and the stock is being fed, and during the time, from about the points 10 to 17, the main slide or carrier 185 is returning at its accelerated speed to its initial position to repeat such operation.

It will be understood, of course, that the details of mechanism which have been herein delineated may be varied within certain limits without departing from the spirit of this invention, and that the detailed description herein given has been made somewhat extended in order to give a clear understanding of the operations of the various parts of the device.

One of the advantages of this wood carving machine is that the various elements of the mechanism are so arranged or assembled as to cause a complete coincidence between the velocity of the stock and the velocity of the tools, and that therefore the tools are permitted to accomplish their function during a continuous movement, while the stock is being fed at a continuous velocity.

It will now be observed that I have provided a construction wherein a plurality of independently operable mechanisms are so organized and arranged that tools will produce incisions in stock intermittently and at predetermined periods while the stock is fed continuously, but with variable velocity, and that this result is accomplished with a high degree of rapidity and efficiency. It will also be seen that the stock is projected along at different velocities, and at a different velocity from that of the velocity with which the tools are designed to be operated; that the tools perform their work at a high velocity while the velocity of the stock feed is the highest; that the velocity of the stock is decreased while the tools are withdrawn from the stock; that said tools repeat incisions into the stock intermittently and at predetermined periods simultaneously with the continuous movement of the stock, and that the carriage carrying the tools has a movement simultaneous with the movement of the stock, so that a complete coincidence is obtained. It will also be seen that I so construct or organize certain elements of mechanism that the continuous feed of the stock will be varied or unevenly progressed, and that I so organize and connect the various elements of the mechanism that the functions of the various parts of the entire organization may be accomplished by power derived from a single driving shaft designed to be operated at a uniform velocity, and from which uniform velocity varying velocities may be obtained through instrumentalities adapted to afford different ratio velocities with respect to each other and the driver during the movement of the speed varying device. By such an arrangement of parts the tools and the stock will operate at a minimum velocity while the tools are in the stock and the stock will travel at a minimum velocity when the tools are out of the stock, and said stock will be intermittently positioned with respect to the tools, whereby the latter will be able to make their impressions or incisions at equidistant points on the stock.

It will be noted that I use a plurality of independent crank mechanisms for producing the variety of movements and that each affords a different angular velocity with respect to the other, and to the main driver.

Having described my invention I claim:

1. In a carving machine, the combination of a continuous fluctuating stock feed with a stock guide, a plurality of coöperative cutters each formed for cutting a portion of the design upon the stock, and means embodying a slide, a cross slide and a pair of variably moving concentric cranks for reciprocating said slides for imparting to said cutters simultaneous alternate movements in planes perpendicular to said stock guide, during portions of which movements said cutters are within the path of the profile of the stock and during other portions are without such path, and simultaneous reciprocating movements parallel with said stock guide and constant with the feed, the slower movement taking place at the movement of the cutters within said profile.

2. A carving machine embodying a variable stock feed a carrier reciprocatory in a path parallel with the stock feed movement, a pair of cross slides mounted upon said carrier, knives on said cross slides, a link connecting said cross slides, a shaft having a crank engaging said carrier for reciprocating the same, a shaft mounted concentric thereto and having a crank for engaging one of said cross slides for transversely reciprocating it, and means for differently variably rotating said shafts for causing the knives to enter the path of the stock movement during the excursion of reciprocation of the carrier coincident with the stock feed movement.

3. A carving machine comprising stock guiding and feeding means, a slide, means for moving said slide to and fro in the line of the feeding movement and independently reciprocatory tool slides mounted thereon, means of connection between said tool slides, and means for reciprocating one of these transversely of the line of feeding movement and comprising a slide bearing reciprocatory transversely of said slide, a crank engaging the same, and means for revolving the crank with a variable angular movement.

4. In a carving machine, the combination with a variably movable stock feed, of a carrier reciprocatory in a path parallel thereto, knives carried thereby, a crank engaging said carrier, means for revolving the crank at a variable speed, whereby one of the excursions of which will coincide in time and direction with the stock feed, means for reciprocating the knives toward the path of stock feed movement and embodying a slide, a bearing member on said slide and a crank engaging said bearing member, means for variably revolving the crank, and means for adjusting the throw of the crank.

5. In a carving machine, the combination with means for feeding the stock, of a carrier reciprocatory in a path parallel thereto, a slide reciprocatory on the carrier transverse to its path of reciprocation, a hollow shaft having a crank engaging said carrier, a shaft mounted in said hollow shaft and having a crank engaging said slide, each of said shafts having a radially disposed guide-face, a driving shaft eccentric to said shafts, and cranks carried by said driving shaft engaging said radial faces for imparting variable velocities to said shafts.

6. In a carving machine, the combination with means for longitudinally feeding the stock, of a carrier reciprocatory in a path parallel thereto, a slide transversely reciprocatory on said carrier, knives carried by said slide for entering the path of movement of the stock feed, a hollow shaft having a crank engaging said carrier, a shaft located in said hollow shaft, a crank carried by said shaft and engaging said slide, radially disposed engaging faces carried by said shafts and occupying different angular positions relative to the common axis thereof, a driving shaft mounted eccentric to said shafts, and cranks carried thereby and engaging said radial faces whereby the constant angular movement of the driving shaft will impart continuously varying and dissimilar movements to said shafts, whereby the carrier and slide will be reciprocated with varying and dissimilar movements.

7. In a carving machine, the combination with means for feeding the stock, of a carrier reciprocatory in a path parallel thereto and having transversely disposed ways, a bearing block mounted in said ways, a hollow shaft having a crank engaging said bearing block, a tool slide reciprocatory transversely of said carrier and having transversely disposed ways, means for adjusting said ways longitudinally of the slide, a bearing block mounted in said ways, a shaft mounted in said hollow shaft, a crank carried by said shaft and engaging said bearing blocks a crank upon each of said shafts, radially disposed guide-faces upon said cranks occupying different angular positions relative to the common axis of said shafts, a driving shaft disposed eccentrically to said axis, and cranks carried by said driving shaft and located at different radial distances from the axis thereof and engaging said radially disposed engaging faces.

8. In a carving machine, the combination with feed mechanism, of a carrier reciprocatory in a path parallel thereto and having transversely disposed ways, a bearing block mounted in said ways, a hollow shaft having a crank engaging said bearing block, a tool slide reciprocatory transversely of said carrier and having transversely disposed ways, means for adjusting said ways longitudinally of the slide, a bearing block mounted in said ways, a shaft mounted in said hollow shaft, a crank carried by said shaft, said crank engaging said bearing block, a crank upon each of said shafts, radially disposed guide-faces upon said cranks occupying different angular positions relative to the common axis of said shafts, a driving shaft disposed eccentrically to said axis, cranks carried by said driving shaft and engaging said radially disposed engaging faces, a gear wheel mounted eccentrically to said driving shaft, a crank carried by said driving shaft for rotating said gear wheel with variable speed, and a train of gear connecting said gear wheel and said feed mechanism.

9. The combination with a stock feed, of a reciprocatory carrier, a slide transversely reciprocatory on said carrier, a hollow shaft having a crank engaging said carrier, a shaft mounted in said hollow shaft, a crank carried by said shaft and engaging said slide, radially disposed engaging faces carried by said shafts and occupying different angular positions relative to the common axis thereof, a driving shaft mounted eccentric to said axis, cranks carried thereby and engaging said radial faces, whereby the constant angular movement of the driving shaft will impart continuously varying and dissimilar movements to said shafts, whereby the carrier and slide will be reciprocated with varying and dissimilar movements, and knives carried by said slide for entering the path of movement of the stock feed.

10. In a carving machine, the combination with a reciprocatory carrier having transversely disposed ways, a bearing block mounted in said ways, a hollow shaft having a crank engaging said bearing block, a tool slide reciprocatory transversely of said carrier and having transversely disposed ways, means for adjusting said ways longitudinally of the slide, a bearing block mounted in said ways, a shaft mounted in said hollow shaft, a crank carried by said shaft, and engaging said bearing block, a crank upon each of said shafts, radially disposed guidefaces upon said cranks occupying diametrically opposite positions relative to the common axis of said shafts, a driving shaft disposed eccentrically to said axis, cranks carried by said driving shaft and located at diametrically opposite sides thereof and engaging said radially disposed engaging faces, and knives carried by said tool slide.

11. In a machine of the class described, the combination with a continuously driven driver, of two diametrically opposed cranks driven thereby at varying velocities, one of which has a greater radius than the other, two shafts operated by said cranks, connections between said shafts and said cranks embodying arms having guideways in which said cranks operate, a main tool carriage operated by one shaft, tools carried by said carriage and operated by the other shaft, a gear wheel mounted on the main shaft, a feeding mechanism connected with said gear wheel, said feeding mechanism and said main carriage operating at a complete coincidence during the period when the tools enter and complete their operation in the stock, substantially as described.

12. In a machine of the class described, the combination with a main driver operating at a uniform velocity, of an eccentrically mounted hub carried thereby, a gear wheel mounted on said hub and variably driven by said driver, a feeding mechanism connected with said gear wheel and also variably driven, a crank carried by said driver, a main carriage operated by said crank, said gear wheel and crank being so related that a complete coincidence of movement is obtained between the stock and the carriage during a portion of their movements.

13. In a machine of the character described, the combination with a main driver operating at a uniform velocity, of an eccentrically mounted hub carried thereby, a gear wheel mounted on said hub and variably driven by said driver, a feeding mechanism connected with said gear wheel and also variably driven, a crank carried by said driver, a main carriage operated by said crank, said gear wheel and crank being so related that a complete coincidence of movement is obtained between the stock and the carriage during the period when the tools enter and complete their operation in the stock, a second crank carried by said driver, a secondary tool carriage operated by said second crank, and a plurality of tools transversely mounted upon said carriages and operating simultaneously with the movement of the tool carriage, substantially as described.

14. In a machine of the class described, and in which a tool carriage is operated in unison on its forward stroke with the feed of the stock, the combination with a uniformly driven driver, of crank arms carried thereby and each of which has a varying velocity, shafts operated by said crank arms, an adjustable member carried by one shaft, a tool carriage coöperating with said adjustable member and operating to and fro in the same plane as the plane of movement of the stock, the other shaft operating the tools on the carriage, a gear wheel on the main driver, a feeding mechanism variably operated by the gear wheel, the velocities of the carriage and the feed being such that when the tools are in the stock said feed and carriage will operate in coincidence, substantially as described.

15. The combination with a carving machine having means for engaging the stock for feeding the same, a carrier reciprocatory in a path parallel with the path of stock feed, knives carried thereby for incising the stock and a slide mounted on said carrier for transverse reciprocation for moving the knives toward and from the stock, of a driving shaft having a pair of cranks, a shaft having a crank engaging said carrier and a crank engaging one of the cranks on the driving shaft, a shaft having a crank engaging said slide and a crank engaging the other crank on the driving shaft, a train of mechanism for operating the feeding means and embodying a crank and a crank on the driver for engaging the same.

16. In a carving machine, the combination with means for engaging the stock for feeding the same, of a carrier reciprocatory in a path parallel thereto, a slide mounted thereon for transverse reciprocation, knives controlled by said carrier and slide, a hollow shaft, a crank carried thereby and engaging said carrier, a shaft mounted in said hollow shaft and provided with a crank engaging said slide, each of said shafts being provided with radially disposed engaging faces, a driving shaft disposed eccentrically to the axis of said shafts and provided with cranks disposed on opposite sides of its axis, said cranks engaging said radial engaging faces, a bearing surrounding said driving shaft and eccentric thereto, a gear wheel mounted upon said eccentric bearing, a train of gear between the stock engaging device and such gear wheel, a crank having a radially disposed face fast with said gear wheel, and a crank carried by the driving shaft and engaging said crank carried by the gear.

17. In a carving machine comprising a stock guide, a feeding device for the stock, a driving shaft, means controlled thereby for moving knives in a circuitous path for entering and retreating from the stock while the same is in motion, a train of gear for driving said stock feeding means comprising a gear wheel mounted eccentric to said driving shaft and having a radially disposed bearing face, a bearing member located therein, and a wrist carried by the driving shaft and engaging said bearing member.

18. In a carving machine, the combination with a table, of means for feeding stock along the table, a carrier reciprocatory parallel thereto, transversely disposed ways on the carrier, a member mounted on said ways and having a bearing, a slide mounted upon said carrier for transverse reciprocation, said slide being provided with transverse ways, a member having a bearing mounted on said ways, a pair of shafts disposed one within the other, the outer of which shafts having a crank and wrist, the wrist entering the bearing in the member mounted on the ways of the carrier, means for radially adjusting said wrist relative to the axis of the shaft, the inner of said shafts having a wrist engaging the bearing in the bearing member of the slide, said shafts being provided with cranks having radially disposed bearing faces, slides mounted in such bearing faces and having bearings, a driving shaft disposed eccentrically to the axis of said shafts, cranks carried by said shaft upon opposite sides and wrists carried by said cranks at different radial distances, the longer of which is mounted in the bearing carried by the outer shaft, and the shorter of which engages the bearing carried by the inner shaft, a bearing surrounding the driving shaft and eccentric thereto its axis being disposed upon the opposite side of the axis of the driver from the axis of said shafts, a spur wheel mounted upon said eccentric bearing, a slideway in the nature of a crank carried by said spur wheel, a bearing block mounted to slide therein, a wrist carried by the driving shaft and located in said bearing, said wrist being in the radial line of the wrist engaging the outer shaft, and a train of gear connecting said spur wheel to the feed mechanism.

19. In a carving machine, the combination with feed mechanism, a carrier reciprocatory in a path parallel thereto, a shaft having a radially adjustable crank wrist engaging said carrier for reciprocating the same, said shaft having a crank transversely disposed to the line of adjustment of said crank wrist, a slide mounted upon said carrier for transverse reciprocation, a shaft having a crank wrist engaging said slide and said shaft having a transversely disposed crank, a driving shaft disposed eccentrically to said shafts and carrying crank wrists upon opposite sides of its axis for engaging said cranks for imparting variable movement thereto, and means controlled by the driving shaft for driving the feed mechanism.

20. In a carving machine, the combination with feed mechanism, a carrier reciprocatory in a path parallel with the feed movement and provided with transverse ways, a slide mounted therein and provided with a bearing, a hollow shaft having a radially adjustable crank wrist mounted therein, a tool slide mounted upon said carrier for transverse reciprocation and provided with transversely disposed ways, means for adjusting said ways, a slide mounted therein and having a bearing, a shaft mounted in said hollow shaft and provided with a wrist engaging said bearing, a crank upon each of said shafts, said cranks being provided with radially disposed guide faces, a driver eccentrically disposed relatively to the axis of said shafts and provided with crank wrists engaging said radially disposed faces, means for imparting uniform movement to said driving shaft, and means controlled by the driving shaft for driving the feed mechanism.

21. In a carving machine, the combination with a frame embodying a table, of a stock guide thereon, a carrier provided with guide ces, gibs adjustably mounted upon the ame for engaging said guide faces for iiding the carrier and for holding it to e table, transversely disposed ways on said rrier, a slide having a circular bearing ounted in said ways, a hollow shaft, a ank wrist carried by said shaft and en- iging said circular bearing, a tool slide ounted upon said carrier and having guide ces, gibs transversely disposed upon said rrier for guiding said slide and holding e same to said carrier, transversely dis- )sed ways carried by said slide, a slide dis- )sed therein and having a circular bearing, shaft mounted in said hollow shaft and iving a crank wrist engaging said circular aring, means for rotating said shafts with iriable velocities for imparting variable ovements to said carrier and tool slide, a ed mechanism having variable movement, id knives controlled by said tool slide.

22. In a carving machine, the combination ith a frame embodying a table, of a stock iide thereon, a carrier having a down- ardly opening chamber at each end and e side walls of said chambers having lon- tudinally disposed slideways, gibs upon e frame for engaging said slideways for iiding the carrier and for holding it to the ble, a hollow shaft, a crank wrist carried r said shaft and engaging said carrier, a ide mounted upon said carrier and having ngitudinally disposed slide ways, gibs ansversely disposed upon said carrier and gaging said slide ways, a shaft mounted in id hollow shaft and carrying a crank rist engaging said slide, means for rotat- g said shafts with variable velocities, a ed mechanism having variable movement id coöperative with the stock guide, and iives controlled by said tool slide.

23. In a carving machine, the combination ith a frame embodying a table, of a stock iide thereon, a carrier, means for guiding e carrier in a path parallel with said stock iide and for holding it to the table, means r reciprocating said carrier, a pair of tool des mounted upon said carrier for trans- rse reciprocation, knives carried thereby, ansversely disposed ways carried by one of id slides, a slide disposed therein and hav- g a circular bearing, a shaft, a crank en- ging said circular bearing, means for ro- ting said shaft with a variable velocity, id means connecting said slides for caus- g them to move in unison.

24. In a carving machine, the combination th a frame embodying a table, of a stock iide thereon, a carrier having a down- ardly opening chamber at each end and the le walls of said chambers having longitu- nally disposed slideways, gibs upon the ame for engaging said slideways for guid- g the carrier and for holding it to the table, means for reciprocating said carrier, a slide mounted upon said carrier and hav- ing longitudinally disposed slide ways, gibs transversely disposed upon said carrier and engaging said slide ways, a shaft carrying a crank wrist engaging said slide, means for rotating said shaft, a slide on said carrier reciprocatory in a plane intersecting the plane of reciprocation of said former slide, a link connecting said slides, and knives car- ried by the slides.

25. In a carving machine, the combination with a frame, of a stock guide thereon, a car- rier upon the frame, means for reciprocating the carrier in a path parallel with the stock guide, a slide mounted upon the carrier for transverse reciprocation, said slide being chambered, a member provided with guide- ways disposed transversely of the slide and located in said chamber, set screws for ad- justably holding said member in position, a slide provided with a bearing mounted upon said guideways, a shaft provided with a crank wrist engaging said bearing, means for rotating said shaft, and knives con- trolled by said slide.

26. In a carving machine, the combination with a uniformly driven driver, of a crank carried thereby and rotated at a constantly varying velocity, a member carried by said shaft, a stock guide, a feeding mecha- nism operated by said member for va- riably feeding the stock along said stock guide, a tool slide connected to and re- ciprocated by said crank, and means con- nected with said slide and crank whereby the forward movement of said slide will be in unison with the movement of the stock.

27. In a carving machine, the combination with a stock guide, of a feeding member and means for imparting continuous forward movement thereto for feeding stock along said guide with variable velocity, a slide mounted for reciprocation parallel with and adjacent to the stock guide, a driving shaft, an intermediate shaft connected to actuate said slide and provided with a driving arm having a radially disposed guide and a driv- ing connection on said driving shaft engag- ing with said guide of the intermediate shaft thereby to impart to the intermediate shaft a variable movement on the uniform rota- tion of the driving shaft for bringing a por- tion of the forward movement of said slide into coincidence with the advancing move- ment of the stock.

28. In a carving machine, the combination with feed mechanism, of a carrier reciproca- tory in a path parallel to the path of feed movement, a shaft provided with a flange, said flange having guideways disposed transversely of the shaft, a wrist engaging said carrier, a member carrying said wrist and mounted on said guideways, a tool slide mounted on said carrier for reciprocation transversely to the path of stock feed movement, a shaft provided with a wrist engaging tool slide, and means for rotating said shafts.

29. In a carving machine, the combination with feed mechanism, of a carrier reciprocatory in a path parallel to the path of feed movement, a shaft provided with a flange, said flange having guideways disposed transversely of the shaft, a wrist, said carrier being provided with transverse ways, a compensating slide mounted on said ways and in engagement with said wrist, a member carrying said wrist and mounted on said guideways, a tool slide mounted on said carrier for reciprocation transversely to the path of the feed movement, said tool slide being provided with longitudinally disposed ways, a member mounted in said ways on the tool slide and having transversely disposed ways, means for adjusting the position of said member on the said longitudinal ways, a compensating slide mounted upon the transverse ways on said member and provided with a bearing, a shaft provided with a wrist entering said bearing, and means for rotating said shafts.

30. In a carving machine, the combination with feed mechanism, of a carrier reciprocatory in a path parallel to the path of feed movement, a hollow shaft provided with a wrist and means for adjusting the same transversely of said shaft, compensating means for connecting the carrier and wrist, a tool slide mounted on said carrier for reciprocation transversely to the path of the feed movement, a shaft mounted within said hollow shaft and provided with a wrist, compensating means for connecting the tool slide and said wrist, and means for rotating said shafts at variable speed and comprising a driver disposed in eccentric relation to said shafts and provided upon opposite sides with wrists and means carried by one of said shafts for engaging one of said wrists and means carried by the other of said shafts for engaging the other of said wrists.

31. In a carving machine, the combination with feed mechanism, of a carrier reciprocatory in a path parallel to the path of feed movement, a hollow shaft provided with a flange, said flange having guideways disposed transversely to the shaft, a wrist, said carrier being provided with transverse ways, a compensating slide mounted on said ways and in engagement with said wrist, a member carrying said wrist and mounted on said guideways, means for adjusting the position of said member on said guideways, a tool slide mounted on said carrier for reciprocation transversely to the path of the feed movement, said tool slide being provided with longitudinally disposed ways, a member mounted in said longitudinal ways on the tool slide and having transversely disposed ways, means for adjusting the position of said member on the said longitudinal ways, a compensating slide mounted upon the transverse ways on said member and provided with a bearing, a shaft mounted within said hollow shaft and provided with a wrist entering said bearing, and means for driving said shafts at variable speed.

32. In a carving machine, the combination with feed mechanism, of a carrier reciprocatory in a path parallel to the path of feed movement, a hollow shaft provided with a flange, said flange having guideways disposed transversely to the shaft, a wrist, said carrier being provided with transverse ways, a compensating slide mounted on said ways and in engagement with said wrist, a member carrying said wrist and mounted on said guideways, means for adjusting the position of said member on said guideways, a tool slide mounted on said carrier for reciprocation transversely to the path of the feed movement, said tool slide being provided with longitudinally disposed ways, a member mounted in said longitudinal ways on the tool slide and having transversely disposed ways, means for adjusting the position of said member on the said longitudinal ways, a compensating slide mounted upon the transverse ways on said member and provided with a bearing, a shaft mounted within said hollow shaft and provided with a wrist entering said bearing, means for driving said shafts at variable speed, and means connected to said shaft driving means for driving the feed mechanism at variable speed.

33. In a carving machine, the combination with fed mechanism, of a carrier reciprocatory in a path parallel to the path of feed movement, a hollow shaft provided with a wrist engaging the carrier, means for adjusting the wrist transversely of the shaft, a tool slide mounted on said carrier for reciprocation transversely to the path of the feed movement, a shaft mounted within said hollow shaft and provided with a wrist engaging said slide, and means for driving said shafts at variable speed.

34. In a carving machine, the combination with feed mechanism, of a carrier reciprocatory in a path parallel to the path of feed movement, a hollow shaft provided with a flange, said flange having guideways disposed transversely to the shaft, a wrist engaging the carrier, a member carrying said wrist and mounted on said guideways, means for adjusting the position of said member on said guideways, a tool slide mounted on said carrier for reciprocation transversely to the path of the feed movement, a shaft mounted within said hollow shaft and provided with a wrist engaging said tool slide, nd means for rotating said shafts at variable speed.

35. In a carving machine, the combination with feed mechanism, of a carrier reciprocatory in a path parallel to the path of feed movement, a hollow shaft provided with a wrist, means for adjusting the wrist transversely of the shaft a compensating slide mounted on said carrier and in engagement with said wrist, a tool slide mounted on said carrier for reciprocation transversely to the path of the feed movement, a compensating slide shiftable transversely of said tool slide and provided with a bearing, a shaft mounted within said hollow shaft and provided with a wrist entering said bearing, and means for driving said shafts at variable speed.

Signed at my office, Nos. 9 to 15 Murray street, New York, N. Y., this 12th day of December, 1905.

FRANCIS H. RICHARDS.

Witnesses:
CHAS. LYON RUSSELL,
JOHN O. SEIFERT.